United States Patent
Petranovich

(10) Patent No.: US 8,644,341 B1
(45) Date of Patent: Feb. 4, 2014

(54) MAC STRUCTURE WITH PACKET-QUASI-STATIC BLOCKS AND ARQ

(75) Inventor: James E. Petranovich, San Diego, CA (US)

(73) Assignee: Sigma Designs Israel S.D.I. Ltd, Tel Aviv (IL)

( * ) Notice: Subject to any disclaimer, the term of this patent is extended or adjusted under 35 U.S.C. 154(b) by 1210 days.

(21) Appl. No.: 10/950,261

(22) Filed: Sep. 24, 2004

Related U.S. Application Data

(60) Provisional application No. 60/506,642, filed on Sep. 26, 2003.

(51) Int. Cl.
*H04J 3/24* (2006.01)

(52) U.S. Cl.
USPC .......................................... 370/474; 370/473

(58) Field of Classification Search
USPC ......... 370/204, 208, 335, 342, 474, 479, 511, 370/514, 473
See application file for complete search history.

(56) References Cited

U.S. PATENT DOCUMENTS

| | | | |
|---|---|---|---|
| 5,036,526 A * | 7/1991 | McNicol et al. | 375/261 |
| 5,889,791 A * | 3/1999 | Yang | 714/752 |
| 5,930,265 A * | 7/1999 | Duault et al. | 370/473 |
| 6,192,026 B1 * | 2/2001 | Pollack et al. | 370/203 |
| 6,437,711 B1 * | 8/2002 | Nieminen et al. | 341/67 |
| 6,868,519 B2 * | 3/2005 | Beacken et al. | 714/762 |
| 7,061,915 B2 * | 6/2006 | Seidel et al. | 370/394 |
| 2004/0213291 A1 * | 10/2004 | Beshai et al. | 370/473 |

OTHER PUBLICATIONS

Newton's Telecom Dictionary by Harry Newton, 22nd edition, 2006.*

* cited by examiner

*Primary Examiner* — Dady Chery
(74) *Attorney, Agent, or Firm* — Eitan, Mehulal & Sadot

(57) ABSTRACT

A MAC layer protocol that converts packets into a data stream is presented. The protocol layer accepts packets (like Ethernet packets) and converts them into blocks. The packets may be segmented into multiple hocks and multiple packets or packet fragments may be contained in a block. The blocks contain information for reassembling the data. All blocks may be exactly the same size and format, with the same coding. This allows blocks to be precisely recovered even when some of the bits on the stream have errors on them. The blocks may be interleaved and coded. Each block may be decoded independently of other blocks. The blocks may be numbered, so an ARQ mechanism may request that any missing blocks be resent without asking for a whole packet to be resent. The data stream may be passed to a physical layer like an OFDM or WOFDM stream of data.

13 Claims, 23 Drawing Sheets

| Type 0 | Flags Reserved | All Zeroes | CRC | RS PARITY |

Fig. 5

| Type 1 | Flags Reserved | LMAC Control Message(s) | All Zeroes Filler (Optional) | CRC | RS PARITY |
|---|---|---|---|---|---|

Fig. 6

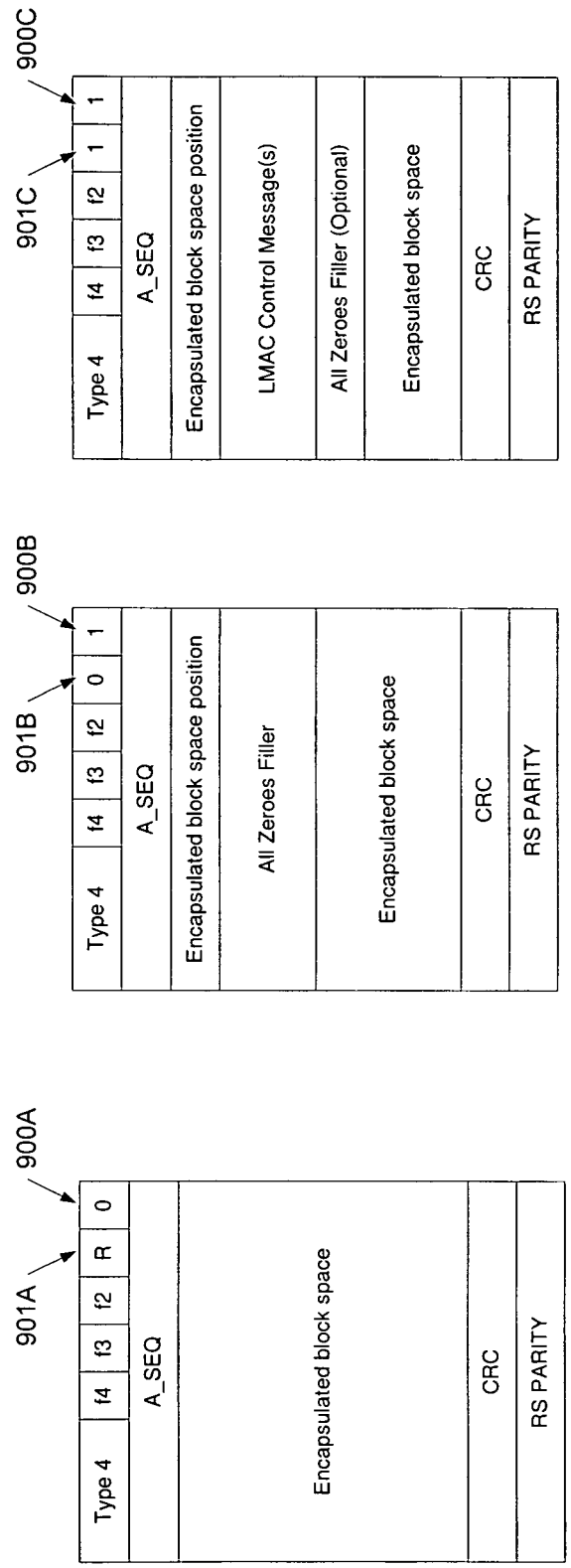

| ID Type (b15-b12) | ID Value (b11-b0) | Logical Channels | Description |
|---|---|---|---|
| 0x0 | 0x000-0xFFF | Connections (Unicast or MCAST) | 0x000: Reserved<br>0xFFF: Reserved for use by PLNs to broadcast TL messages.<br>0x001-0xFFE: Unicast or Multicast Connection IDs assigned by CBWM |
| 0x1 | 0x000-0xFFF | Reserved | Reserved |
| 0x2 | 0x000-0xFFF | DCLChs | 0x000: Reserved for use by PLNs prior to Association.<br>0xFFF: Reserved for use by PLNs to broadcast control messages.<br>0x001-0xFFE: DCLCh IDs assigned to PLN by CCo |
| 0x3 | 0x000-0xFFF | DDLChs | 0x000: Reserved<br>0x001-0xFFF: DDLCh IDs assigned to CCo by PLN during Connection Establishment |

Fig. 20

| Frame No. (11b) | Slot No. (8b) | Symbol No (4b) | Sub-Symbol count (5b) |
|---|---|---|---|
| Transmitted in the Beacon Logical Channel (BeLCh) | Always zero in the Slot containing the Central Beacon | Always zero at first Symbol of the Central Beacon | Clocked at 1 MHz |

Fig. 22

MAC STRUCTURE WITH PACKET-QUASI-STATIC BLOCKS AND ARQ

RELATED APPLICATIONS

This application claims priority from U.S. Provisional Application No. 60/506,642, filed on Sep. 26, 2003, herein incorporated by reference. The following U.S. Patent Applications are also incorporated by reference in their entireties and made part of the present application:

U.S. patent application Ser. No. 10/949,861, titled "Circular Constellations with Coherent Gain/Differential Phase and Pilots," filed concurrently with the present application;

U.S. patent application Ser. No. 10/950,262, titled "Frame Structure for OFDM Signaling, Including Beacons and Traffic," filed concurrently with the present application;

U.S. patent application Ser. No. 10/950,063, titled "Broadcast with Redundant Coding," filed concurrently with the present application; and U.S. patent application Ser. No. 10/949,956, titled "Channel Sounding and Channel Analysis," filed concurrently with the present application.

BACKGROUND OF THE INVENTION

1. Field of the Invention

The present invention relates generally to communication over Ethernet-Class network and, more specifically to encoding methods for robust communication over noisy communications media.

2. Background

The vision of the networked home has driven many a business plan, but product offerings to date have been too limited in capability or in market potential to achieve the dream. Home networking is different than networking in the workplace. The applications are different, the traffic patterns are different, and the media available to carry the data are different. Certainly home networking users will want to transfer files between their computers and share peripherals such as printers. They will want gateways to broadband access so they can share their Internet connection between multiple devices. Users will also want other services, such as voice-over-IP (VoIP), streaming media for entertainment, and support for multi-player networked games.

While some newer houses are wired with cables suitable for Ethernet, most are not. This limits the choices for home network physical medium to phone wiring, wireless, and power line, each presenting a mixed bag of attributes.

There has been a proliferation of wireless networking and related components in recent years. However, wireless communication suffers from blind spots in certain areas of the home requiring equipment that is expensive and sophisticated, and maybe some technical acumen not available to the average homeowner.

Telephone line networking is also taking hold. However, many households lack phone jacks at convenient locations to achieve the foreseeable benefits of home networking. For instance, some older houses may only have one phone jack located in the kitchen for use in the kitchen and other living areas (e.g. living room, family room, etc). Thus, it may be inconvenient or messy to provide network connections to remote devices. Power plugs, on the other hand, are located virtually in every room in the home. And some homes have multiple power outlets located in every corner of every room. However, the power line appears to be the most difficult medium of these three for communication, but it does have two appealing attributes. First, as with phone lines, no RF conversion hardware is needed and, thus, the cost can be low compared to wireless solutions. But more importantly, power outlets are almost everywhere someone might want to use a networked device at home.

The power line medium is a harsh environment for communication. For instance, the channel between any two outlets in a home has the transfer function of an extremely complicated transmission line network with many stubs having terminating loads of various impedance. Such a network has an amplitude and phase response that varies widely with frequency. At some frequencies the transmitted signal may arrive at the receiver with relatively little loss, while at other frequencies it may be driven below the noise floor. Worse, the transfer function can change with time. This might happen because the homeowner has plugged a new device into the power line, or if some of the devices plugged into the network have time-varying impedance. As a result, the transfer function of the channel between outlet pairs may vary over a wide range. In some cases, a broad swath of bandwidth may be suitable for high quality transmission, while in other cases the channel may have a limited capacity to carry data.

Due to these potential frequency variations, efficient use of the power line medium requires an adaptive approach that compensates for the channel transfer function in some way. Fortunately, advances in ASIC density enables the use of sophisticated signal-processing techniques at price points that makes Ethernet-class home networking via power lines a cost-effective reality. Sophisticated ASIC-based signal processing technology makes it possible to keep a lid on the interference and transfer function degradations that compromise the power line transmission medium.

Prior art powerline communication systems include an effective and reliable method of performing adaptation that achieves rates of between 4-21 MHz on typical channels, but which adjusts the bit rate to fight through really harsh channels. In addition to the transfer function problem, and equally significant, interference on the power line must be considered. The most severe interference sources rarely have properties similar to the easily analyzed white Gaussian noise produced by receiver front ends. Instead, the interference can be either impulsive or frequency selective in nature, and sometimes both.

Typical sources of noise are brush motors, fluorescent and halogen lamps, switching power supplies, and dimmer switches. In addition, ingress sources such as amateur band radio transmitters can be significant. The net impact of these different interference sources is that raw received data bits tend to have significant numbers of bit errors, which must somehow be corrected. Prior art powerline technology devices contain a combination of sophisticated forward error correction (FEC), interleaving, error detection, and automatic repeat request (ARQ) capabilities to ensure that the channel appears completely reliable to the network layer protocols.

However, as the size of the home network increases and with bandwidth demands skyrocketing, it is desirable to provide means for robust communication of data in a powerline network environment. Any workable solution for reliable communication on the power line medium must include both a robust physical layer (PHY) and an efficient media access control (MAC) protocol. The MAC protocol controls the sharing of the medium among multiple clients, while the PHY specifies the modulation, coding, and basic packet formats.

SUMMARY OF THE INVENTION

The present invention provides a MAC layer protocol that converts packets into a data stream. The protocol layer accepts packets (like Ethernet packets) and converts them into blocks. The packets may be segmented into multiple blocks and multiple packets or packet fragments may be contained in a block. Some of the information in the blocks may include the start position of the first packet or packet fragment in the block and the length of each block. The blocks are passed to a noisy scheduled physical layer stream. The physical layer stream is formatted into frame, and can be considered a bit stream with frame boundaries. The block format is determined with a control mechanism and stays constant within a frame. It may, but usually will not, change between frames. All blocks are exactly the same size and format, with the same coding. This allows blocks to be precisely recovered even when some of the bits on the stream have errors on them. The blocks may be interleaved and coded. The blocks may be coded with a CRC and/or Reed-Solomon code or other codes. This will allow each block to be decoded independently of other blocks. The blocks are numbered, so an ARQ mechanism allows the receiver of blocks to ask for any missing blocks to be resent without asking for a whole packet to be resent. The data stream may be passed to a physical layer like an OFDM or WOFDM stream of data.

BRIEF DESCRIPTION OF DRAWINGS

FIG. 5 is an illustration of a sample null block format.

FIG. 6 is an illustration of the structure of an LMAC control block.

FIGS. 9A-C are illustrations of encapsulated LMAC block data format.

FIG. 12A is the Acknowledgement message format when there is no compression.

FIGS. 12B-C are the Acknowledgement message format when there is compression.

FIGS. 13A-B illustrate the expiration message format.

FIG. 20 is an illustration of example Identifier values for Connections and Control Channels.

FIG. 22 is an illustration of the construction of a 28-bits Time Synchronization Function.

DETAILED DESCRIPTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, transmitters, receivers, tone detectors, tone generators, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

Furthermore, it should be appreciated that the particular implementations shown and described herein are merely exemplary and are not intended to limit the scope of the present invention in any way.

Overview of Powerline Technology

Powerline technology delivers a next generation home-networking capability that delivers high-rate, high-quality multiple simultaneous home entertainment streams and other digital content throughout the home using the powerline channel.

Figure 1:
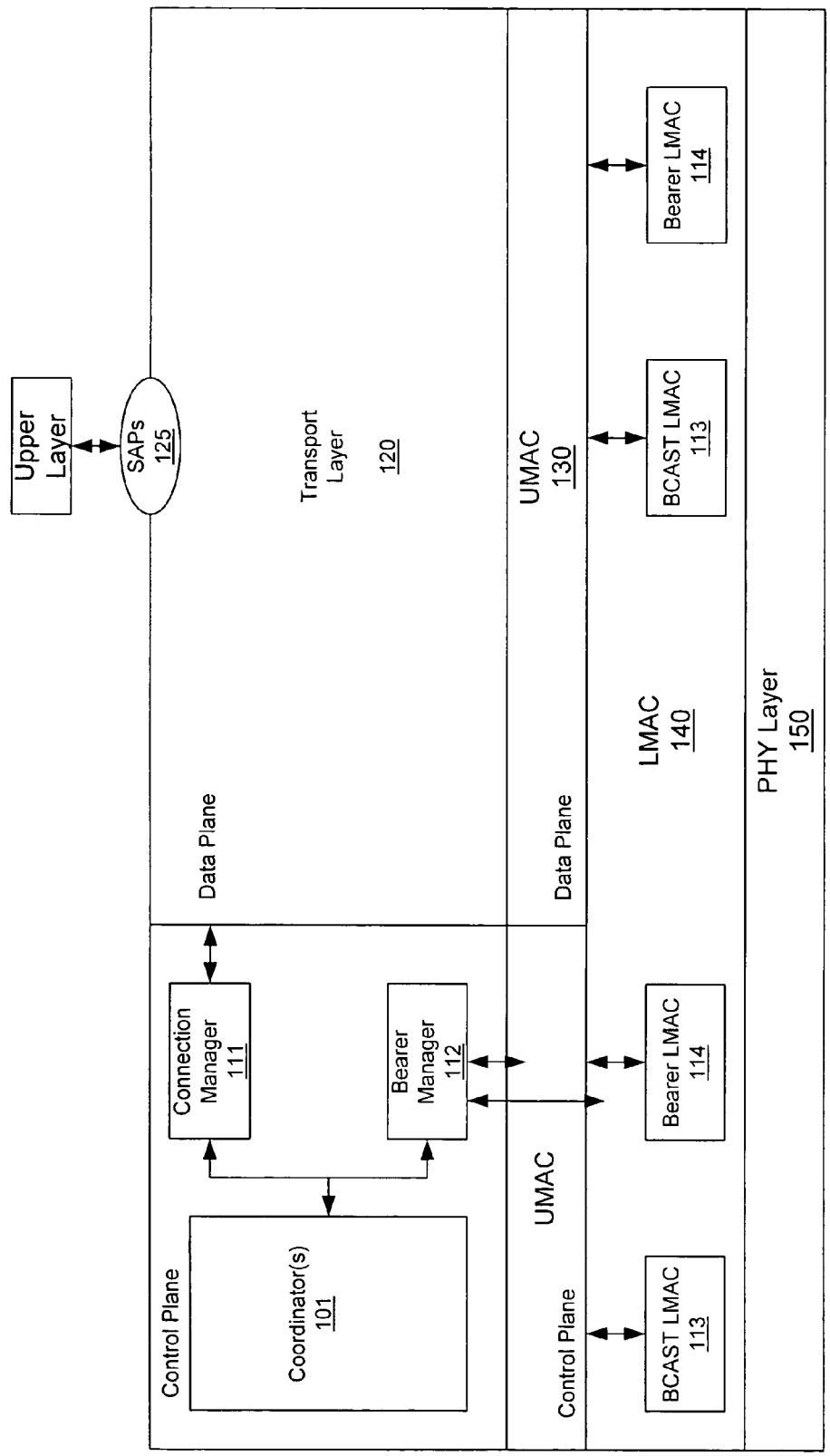
FIG. 1 is an illustration of the system layout of a powerline device.

FIG. 1 is an illustration of the system layout of a powerline network device. As illustrated, a powerline network (PLN) device may be partitioned into four distinct layers based on functionality: the PHY 150, the Lower MAC (LMAC) 140, the Upper MAC (UMAC) 130 and the Transport Layer 120. In addition, there are three management entities called the Connection Manager (CM) 111, the Bearer Manager (BM) 112 and the Coordinator(s) 101. Each coordinator(s) 101 has functions based on the type of network. A PLN system supports a mix of audio, video, and IP applications. Use of Universal Plug and Play (UPnP) may also be employed for service discovery.

Transport Layer 120 roughly aligns with the standard ISO definition for Transport Layer in the OSI model. Transport Layer 120 provides convergence services between other protocols, which may be defined at lower layers of the OSI model, and the device's protocol stack. The Transport Layer can support various applications and protocols. The convergence functions of the Transport Layer include the definition of specific Service Access Points (SAPs) between the Application and the Transport Layer and functions such as Classification engines in the Transport Layer for each SAP 125. The Transport Layer also provides QoS support functions such as QoS specification of traffic flows (called Connections), QoS monitoring and control.

The Upper MAC (UMAC) layer 130 performs framing and multiplexing of application flows and control information flows, and maintains the mapping of Physical Channels to the corresponding flows.

The Lower MAC (LMAC) 140 performs Reed-Solomon Forward Error Correction (FEC) and Automatic Repeat reQuest (ARQ) and interleaves and scrambles the data on individual Physical Channels. The Lower MAC 140 includes communication channels Broadcast (BCAST) LMAC 113 and Bearer LMAC 114.

Communication on the Physical Layer (PHY) 150 is based on Orthogonal Frequency Division Multiplexing (OFDM). The PHY maps the data received from the LMAC into OFDM Symbols and modulates it onto the powerline wiring at frequencies (Tones) and time slots (Slots) allocated to the Physical Channel. A tone is the smallest frequency unit that can carry modulated data. The frequency of Tone k is k times base frequency. In one embodiment, the base frequency is 39.0625 KHz and k ranges from 103 to 716thus providing a communication range of 4-28 MHz.

The PHY 150 uses a variant of orthogonal frequency division multiplexing (OFDM) as the basic transmission technique. OFDM is well known in the arts. It is currently widely used in DSL technology and also in terrestrial wireless distribution of television signals. In contrast to these technologies, however, the powerline technology uses OFDM in a burst mode rather than in continuous mode. Powerline technology also uses concatenated Viterbi and Reed Solomon (RS) FEC with interleaving for payload data, and turbo product coding (TPC) for sensitive control data fields.

OFDM divides the high-speed data stream to be transmitted into multiple parallel bit streams, each of which has a relatively low bit rate. Each bit stream then modulates one of a series of closely spaced carriers. The property of orthogonality is a result of choosing the carrier spacing equal to the inverse of the bit rate on each carrier. The practical consequence of orthogonality is that if a Fast Fourier transform (FFT) of the received waveform is performed over a time span equal to the bit rate on an individual carrier, the value of each point in the FFT output is a function only of the bit (or bits) that modulated the corresponding carrier, and is not impacted by the data modulating any other carrier.

When the carrier spacing is low enough that the channel response is relatively constant across the band occupied by the carrier, channel equalization becomes easy. Implemented in the frequency domain, equalization can be achieved by a simple weighting of the symbol recovered from each carrier by a complex valued constant. Many different types of modulation can be used on the individual carriers.

The need for equalization however is completely eliminated by using differential quadrature phase shift keying (DQPSK) modulation. DQPSK modulation is where the data is encoded as the difference in phase between the present and previous symbol in time on the same subcarrier. Differential modulation improves performance in environments where rapid changes in phase are possible.

The MAC protocol in the powerline technology is a variant of the well-known carrier sense multiple access with collision avoidance (CSMA/CA) protocol. Several features have been added to support priority classes, provide fairness, and allow the control of latency. The use of CSMA/CA means the PHY must support burst transmission and reception; that is, each client enables its transmitter only when it has data to send and, upon finishing, turns off its transmitter and returns to the receive mode.

The PHY uses adaptive modulation methods for each Tone to provide a modulation density from 1 to 10 bits per Simple Symbol. This allows the PHY to dynamically adapt to Channel conditions on a Tone-by-Tone basis thus optimizing throughput.

An embodiment of the present invention defines a Frame that is comprised of Slots and Tones. Each Slot consists of a fixed number of OFDM Symbols. Communication between PLNs occurs in a channel that comprises one or more Slot-Tone Sets (a.k.a. Bursts). The precise mapping of Slot-Tone Sets defining a channel is controlled by the coordinator(s) 101. These mappings may be made known to the PLNs involved either by an allocation when negotiating the communication parameters for the physical channel or at the beginning of each frame by the central coordinator of the network.

If coherent modulation is used, each Slot-Tone Set includes Pilot Tones, which use a fixed BPSK Modulation pattern that is known to all receivers. In one embodiment, Pilot Tones are assigned on an average of about every 16th Tone to assist in receiver demodulation and decoding.

At the beginning of each Frame the coordinator broadcasts a Beacon Message that assigns Physical Channels for the Frame. All Slots not assigned to the physical channels may be reserved. Possible uses determined by the coordinator(s) 101 for these reserved Slots include: Bearers (on which the appropriate PLNs will transmit), silence (for sounding measurements), Sub-Frames for the use of Neighboring powerline networks, or for coexistence with prior art powerline networks.

Figure 2:
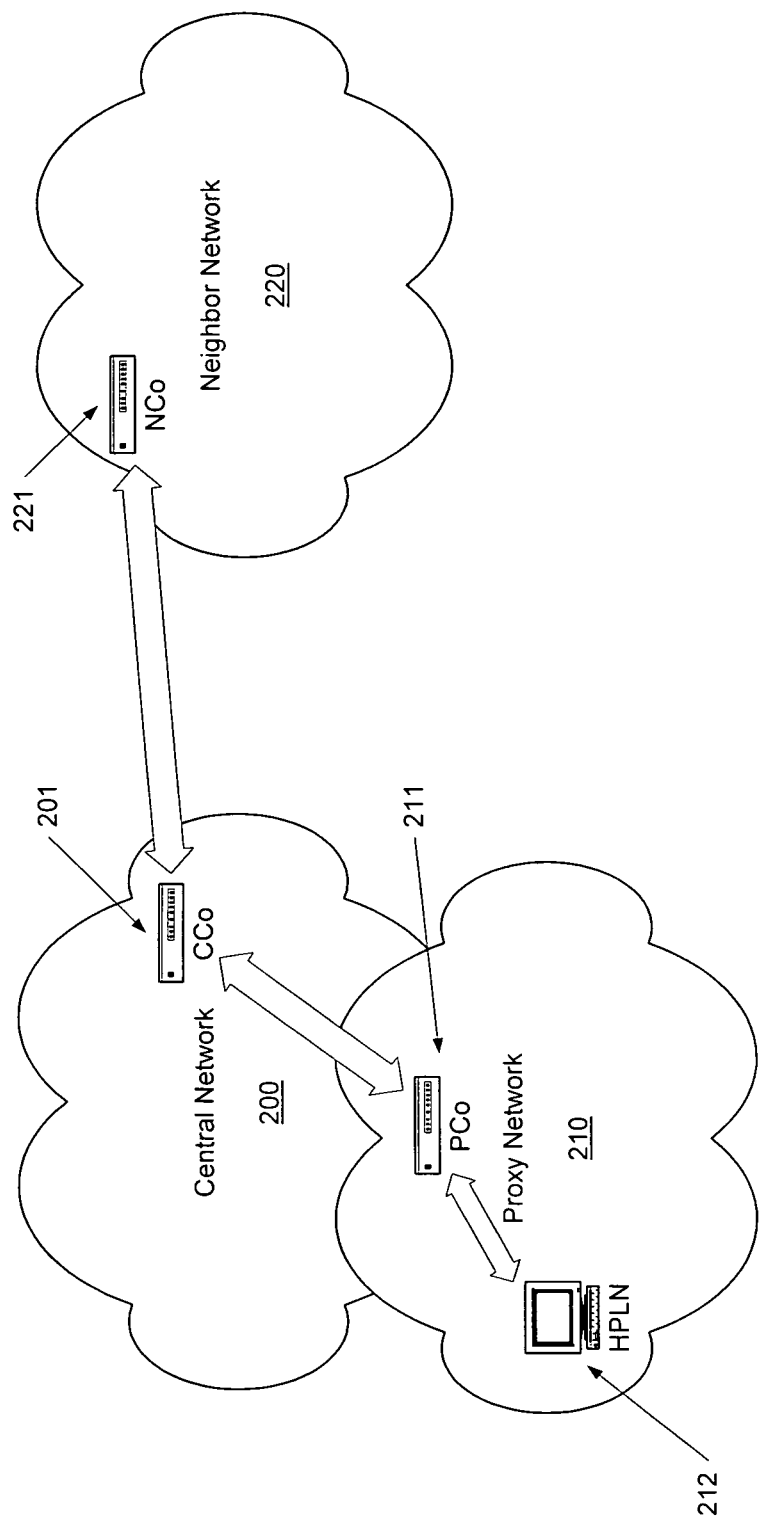
FIG. 2 is an illustration of how multiple powerline networks may exist on the same power line medium.

Neighboring powerline networks may exist, for instance, if users in two neighboring dwellings which share a power line wish to use the powerline communication network. FIG. 2 is an illustration of how multiple powerline networks may exist on the same power line medium. Such networks are called Neighbor Networks. In such a case, the network that has been in existence the longest will be the Central Network (i.e. 200) and the newer network will be the Neighbor Network (i.e. 220). Framing will come from the CCo 201 of the central network, which will allocate a contiguous portion of the Frame to the Neighbor Network. The NCo 221 will control the allocation of the Sub-Frame to the PLNs in the Neighbor Network.

The illustration of FIG. 2 also shows how a proxy network may exist within a powerline network. The creation of a proxy network may occur when a PLN (e.g HPLN 212) is not able to communicate directly with the Coordinator (e.g. CCo 201) of the network to which it logically belongs (e.g. the central or neighbor network). If the PLN (e.g. 212) can communicate with any other PLN (e.g. 211) in the network, PLN 211 becomes the proxy PLN and will communicate the Hidden PLN's (HPLN 212) existence to the CCo 201 (or NCo), which will in turn set up a Proxy Network that will permit HPLN 212 to participate in the network. PLN 211 becomes the Proxy Network Coordinator (PCo 211) and CCo 201 will communicate via PCo 211 which will relay CCo commands to HPLN 212. Note that NCo 221 is the central coordinator of the neighbor network to all PLNs within the neighbor network.

Example Embodiments

As illustrated in FIG. 1, an embodiment of the present invention divides the MAC layer into two distinct layers: a Lower MAC (LMAC) and an Upper MAC (UMAC). The Lower MAC processing depends on whether the channel is a Traffic Channel or a Broadcast Channel.

Figure 23:
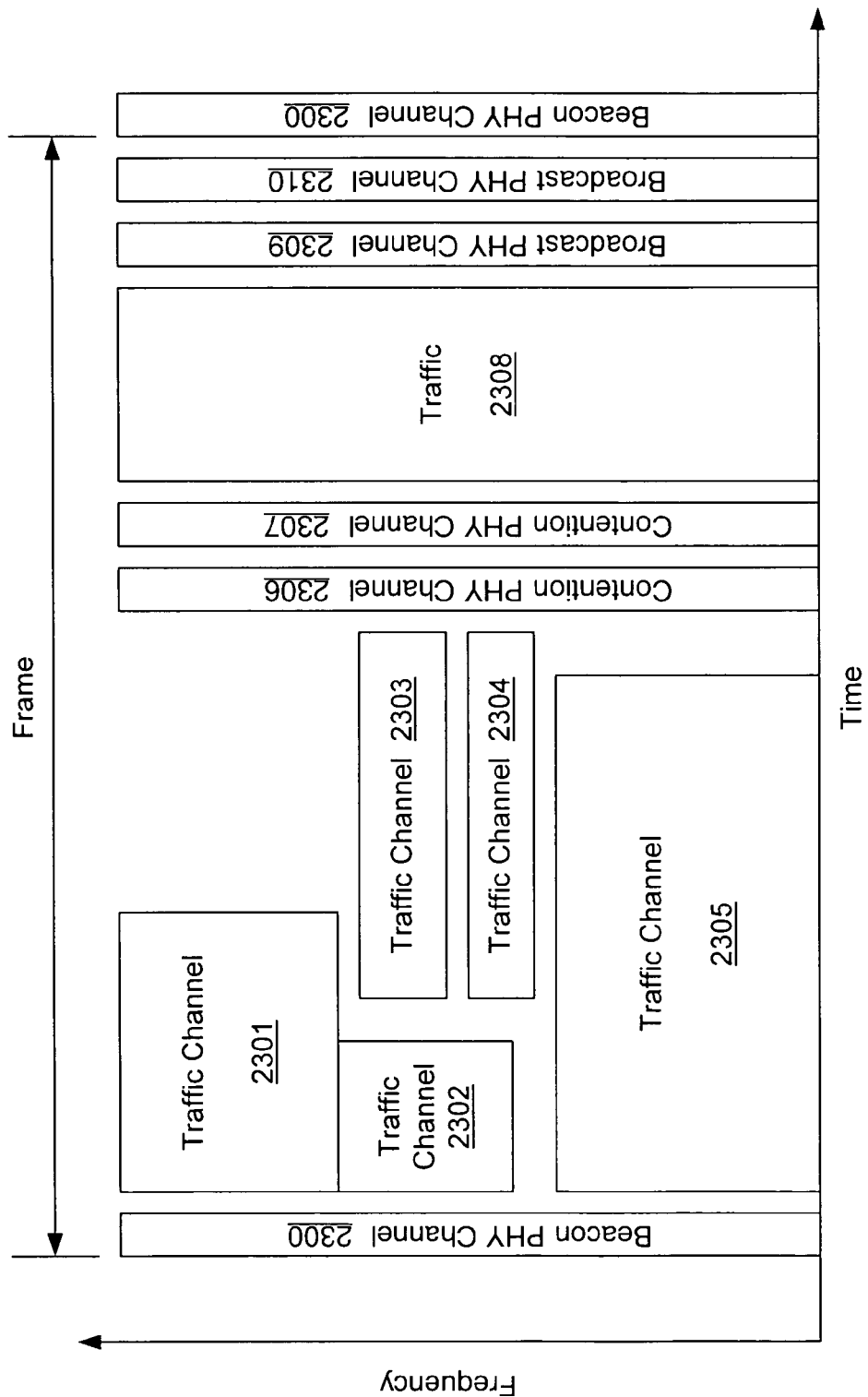
FIG. 23 is an illustration of a sample network frame showing various communication channels for a single network in accordance with an embodiment of the present invention.

FIG. 23 is an illustration of a sample network frame showing various communication channels for a single network in accordance with an embodiment of the present invention. As illustrated, each frame, which is the basic time interval over which the media is scheduled and shared, begins with a Beacon Physical Channel (e.g. 2300) to delineate the beginning of a new frame. The rest of the frame includes a number of traffic channels (e.g. 2301, 2302, 2303, 2304, and 2305), one or more Contention Physical Channels (e.g., 2306 and 2307), Traffic 2308, and one or more Broadcast Physical Channels (e.g., 2309 and 2310).

The Physical Channels (PCh) specify the Tone/Slot Allocations (a slot is the basic unit of time assignment) and all modulation parameters required for communication of bits at the PHY layer between two PLNs or between a PLN and a network Coordinator.

Each embodiment may have several types of physical channels. For instance, an embodiment of the invention defines physical channels such as: the Beacon Physical Channel (BePCh), Contention Physical Channel (CoPCh), Traffic Physical Channel (TrPCh) and Broadcast (BrPCh). Traffic channels use a subset of the Tones (a tone is the basic unit of frequency assignment) in the Tone Mask that is negotiated with the network's Central Coordinator based on the quality of the channel between the transmitter and the intended receiver. This subset of Tones is called the Tone Map. The modulations used for any Tone in the Tone Map can be chosen independently of the modulations used by any other Tone from the complete set of available modulations schemes. All other channel types use all the Tones in the Tone Mask, and they use a specific modulation and coding scheme.

The Lower MAC (LMAC) on Traffic Channels

The LMAC provides a reliable communications link between the Upper MAC (UMAC) and the physical layer (PHY). As illustrated in FIG. 1, the LMAC resides below the UMAC in the protocol stack and above the PHY.

Figure 3:
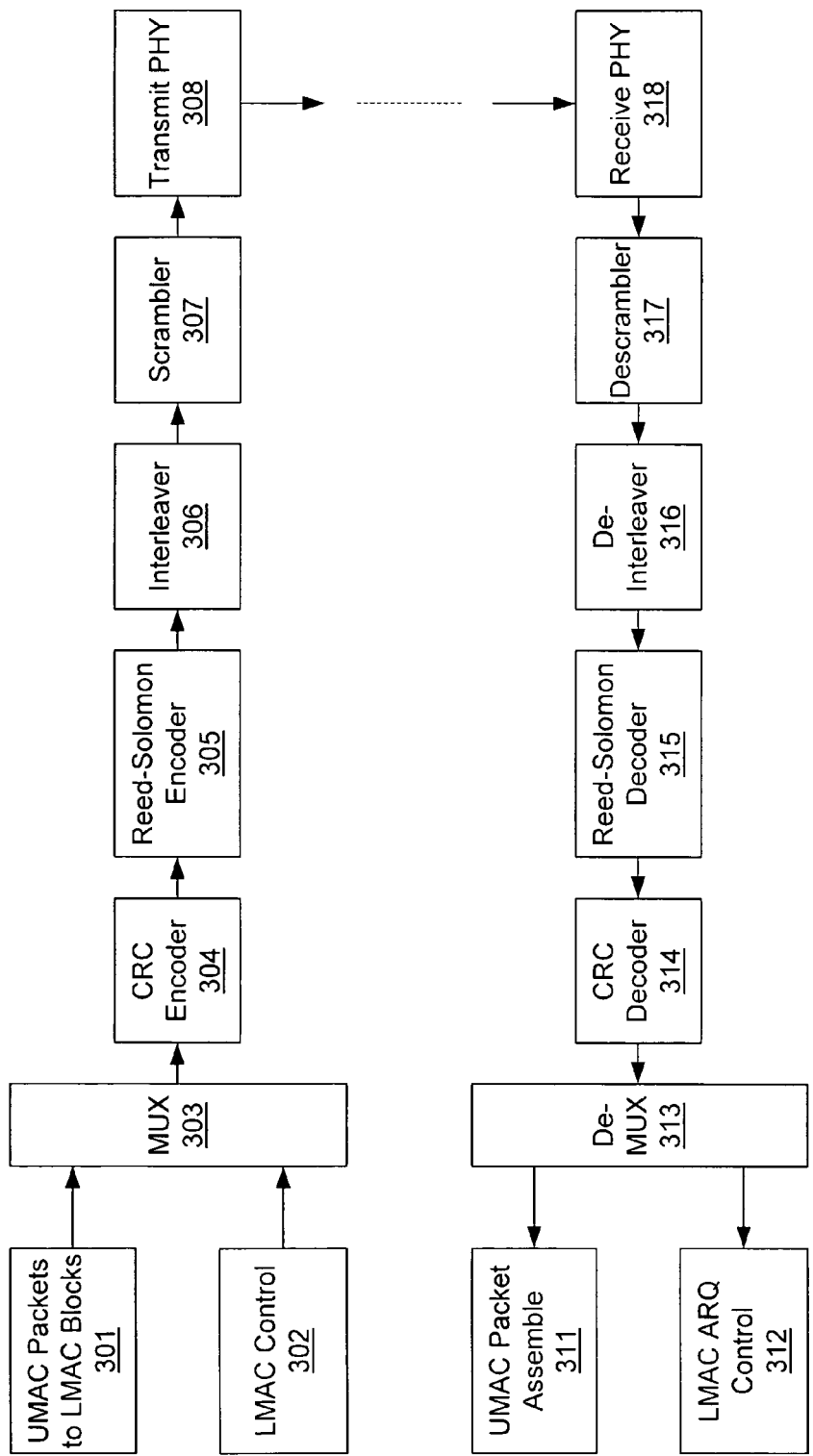
FIG. 3 is an illustration of the functions of a bearer LMAC.

FIG. 3 is an illustration of the functions of the bearer LMAC 114. On the transmit side of each Bearer LMAC 114, packets of data from the UMAC are converted into LMAC blocks in block 301, multiplexed with the LMAC control information 302 in block 303 to support ARQ and packet re-assembly at the LMAC receive side, and added CRC (block 304) and Reed-Solomon FEC (block 305) for error controls. The LMAC blocks are interleaved (block 306) and scrambled (block 307) before being passed to the PHY for transmission in block 308. Transmit PHY 308 transmits the blocks on a block-by-block basis so that blocks that were unsuccessfully transmitted in the past may be re-transmitted as desired. All LMAC blocks on the same Bearer have the same length and the same coding parameters. The configuration of the LMAC block is provided and managed by the Bearer Manager (BM).

Bearers are point to point bi-directional physical links (i.e. Traffic physical Channels) between two Powerline devices (PLNs) or between a PLN and the network Coordinator. Bearers are specified by the following parameters:

allocations in frequency (Tones) and time (Slots)—that may be used to send application data or control information;

modulation information, which includes number of bits per Symbol, and modulation type; and the location of pilot Tones and pilot Symbols (if needed).

Each Bearer has a two-byte identifier called the Bearer ID (BID). A valid range for BID is from 0x0000 to 0xFFFF. Furthermore, the values 0x0000 and 0xFFFF are reserved to represent Broadcast Physical Channels (BrPChs) that are used for sending broadcast control and user messages, respectively. A BrPCh is a Unidirectional Physical Channel that supports a Traffic Logic Channel (TrLCh), and a Device-to-Coordinator Logical Channel (DCLCh). The BrPCh is defined by the Allocation of a single Slot-Tone set using the same modulation type and modulation density on all unmasked Tones.

Each Bearer has an LMAC (lower MAC) function associated with it, that performs coding, interleaving and ARQ. Bearers may carry Traffic Logical Channels (Connections) or Control Logical Channels, e.g., Device-to-Device Logical Channels (DDLChs) or DCLChs.

Bearers are established by the Central Coordinator (CCo) in response to specific requests from the Bearer Manager (BM) in a PLN for a Bandwidth (BW) grant, a Connection establishment, or a Control Channel establishment. Bearers are classified as Negotiable Bearers and Non-Negotiable Bearers. Negotiable Bearers are Bearers where the CCo only makes a coarse Slot/Tone allocation to the two PLNs based on the sounding process. (Sounding is a background process by which the CCo collects and maintains up-to-date information on the quality of the power line channels between individual PLNs.) The two PLNs then communicate with each other and perform Channel Analysis before deciding between themselves the actual Tones and Slots to use, location of the pilot Tones and pilot Symbols (if needed), and the modulation density and modulation type to be used on each Tone. ARQ is performed by the LMAC function associated with this Bearer.

Negotiable Bearers are typically established to support Connections which can tolerate a longer set up delay and carry continuous or streaming application data requiring relatively higher BW and QoS.

Non-negotiable Bearers are Bearers where the CCo specifies all the parameters that define the Bearer, e.g., Tone and Slot assignment and modulation density. A fixed modulation type (e.g. DPSK modulation) may be used for non-negotiable Bearers. There is no Channel Analysis procedure with non-negotiable Bearers. Both PLNs use the CCo specified parameters to exchange application data or control information. The LMAC function associated with the non-negotiable Bearer performs ARQ.

Non-negotiable Bearers are typically established to support connections which cannot tolerate a longer set up delay. These connections typically carry short bursts of data such as in IP applications.

Referring back to FIG. 3, the LMAC receiver performs the reverse processes of the LMAC transmitter. For instance, after the multiplexed blocks from the transmitting PHY are received at the receiving PHY 318, the LMAC descrambles the received blocks in block 317, processes the descrambled blocks through De-Interleaver 316 to remove any interleaving at the transmitting PLN. The receiving LMAC subsequently processes the de-interleaved blocks through Reed-Solomon Decoder 315 and CRC Decoder 314 to remove any error control encoding at the transmitter.

Subsequently, the receiving LMAC demultiplexes (block 313) the received blocks to separate the LMAC ARQ Control data 312 from the LMAC blocks. The receiving PLN then re-assembles the UMAC packets from the LMAC blocks in block 311. The LMAC then passes the regenerated UMAC packets to the UMAC. The receiving LMAC sends ARQ information back to the transmitter (possibly along with its own data blocks if communications are two-way).

As discussed earlier, each bearer has a set of associated parameters. In one or more embodiments, the set of parameters specifying the format of LMAC blocks is associated with each direction for each Bearer LMAC. For instance, each Bearer may have different parameters from each other Bearer and one direction may have different parameters from the other direction. The set of parameters is decided by the CCo when the Bearer is setup. The BM may change parameters while a Bearer is still active. However, changes of those parameters should occur on the Frame boundaries to preclude undesirable effects while communication is in progress.

The table below presents descriptions of LMAC parameters specified by the BM and their valid values.

| Bearer LMAC Parameters | | |
|---|---|---|
| Name | Description | Valid Values |
| BLK_SZ | Block Size, or Size of Each Reed-Solomon Codeword, in Bytes | 55 ≤ BLK_SIZE ≤ 255 |
| RS_PAR | Number of Parity Bytes per Block | 0 ≤ RS_PAR ≤ 20 |
| INT_SZ | Interleave Depth | 1 ≤ INT_SZ ≤ 256 |
| COVER | Cover Sequence or Scrambler Seed | Least significant 32 bits of the Network ID. |

LMAC Block Format Specification

Figure 4:
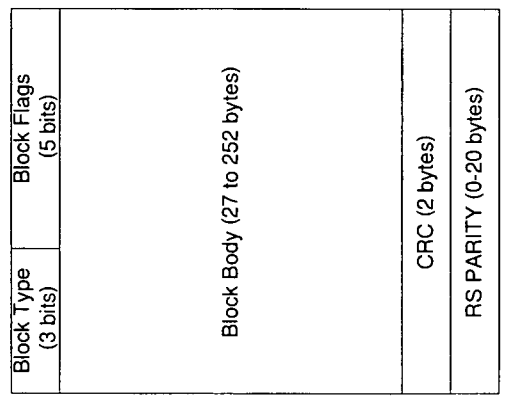
FIG. 4 is an illustration the LMAC block format.

FIG. 4 is an illustration the LMAC block format. The first byte in the LMAC block—the header byte—contains the block type (3 bits) and the block flags (5 bits). The meaning of the block flags and the format of the block body is a function of the block type. Regardless of block type, the last bytes in the block contain the CRC and the Reed-Solomon parity bytes. The CRC is always computed over the block type, block flags, and block body. The number of parity bytes is a function of the LMAC parameters. The parity bytes are computed over all the preceding bytes in the block.

The table below provides a sample list of block types supported in one embodiment of the present invention. The descriptions of the block types are detailed below.

| Sample LMAC Block Types | |
|---|---|
| Block Type | Block Body |
| 0 | Null |
| 1 | LMAC Control |
| 2 | Unacknowledged Data |
| 3 | Acknowledged Data |
| 4 | Encapsulated Blocks |
| 5 | Reserved for Future Use |
| 6 | Reserved for Future Use |
| 7 | Reserved for Future Use |

A null block is a block without valid data. It is intended to be sent as filler when there is no valid data to send. The block flags are reserved (set to zero). The block body data bits are all nominally set to zero. This block type is not acknowledged or re-transmitted. FIG. 5 is an illustration of a sample null block format.

The structure of a LMAC control block is illustrated in FIG. 6. As illustrated, an LMAC control block body contains at least one LMAC control message. The block flags may be reserved (set to zero). The message body may contain LMAC control messages; and the rest of the block may be fillers (all zeroes). In one or more embodiments, the LMAC control block message is not acknowledged or re-transmitted.

Figure 7C:
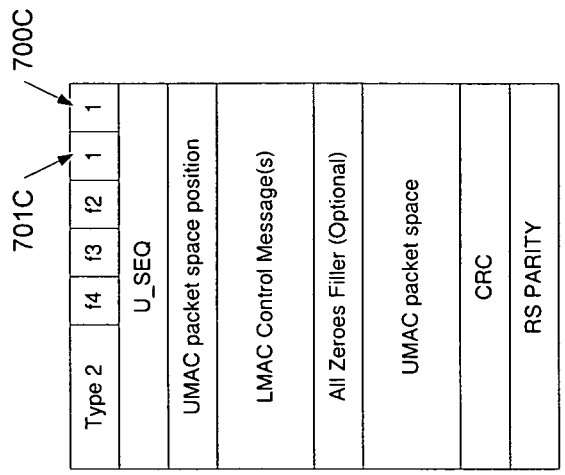
FIGS. 7A-C are illustrations of the structure of "Unacknowledged UMAC data".
Figure 7B:
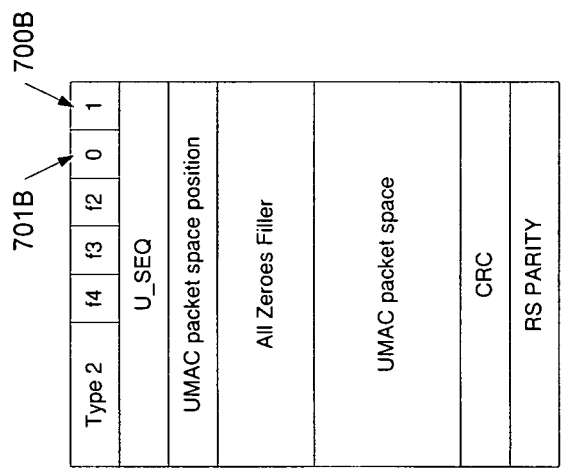
Figure 7A:
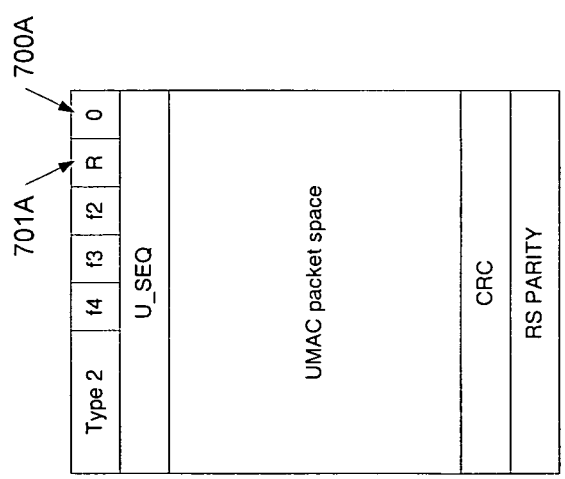

The structure of "Unacknowledged UMAC data" is illustrated in FIGS. 7A-C. An unacknowledged UMAC data block contains UMAC packets or portions of UMAC packets data that do not require reliable communications support from the LMAC layer. The block body may also contain LMAC control messages and/or filler (all zeroes). The second and third bytes of the block contains the sequence number, U_SEQ. This 16-bit sequence number is used for segmentation and re-assembly. The sequence numbers may be assigned sequentially when data packets not requiring acknowledgement are segmented and put into blocks. The receiver may use this sequence number to reassemble the packets and to determine whether a packet is missing. The "U" in "U_SEQ" indicates that this sequence number is used for unacknowledged data blocks only.

The f0 (i.e. 700A-C) and f1 (i.e. 701A-C) flag bits indicate whether there is filler or control data in the block. For instance, if the block body is entirely filled with UMAC data, the least significant flag bit (f0) is cleared (set to zero), i.e., block 700A in FIG. 7A, and the f1 flag bit is reserved or unused (block 701A). When the f0 flag is cleared, as in FIG. 7A, the fourth byte of the block is the start of the UMAC packet space. If there is filler or control data in the block, the f0 flag is set (set to one), i.e., block 700B in FIG. 7B. When the f0 flag is set, the fourth byte of the block indicates the byte position in the block when UMAC packet space begins.

Block flag f1 (i.e. 701A-C) indicates that there is LMAC control data in the block. In one embodiment, the f1 flag will only be set if the f0 flag is also set. If the f1 flag is set, the unacknowledged block format is filled with UMAC data, LMAC Control Message, and fillers as needed. This format with f1 flag set is illustrated in FIG. 7C. In addition, the fifth byte of the block is the start of the LMAC control message field. If the f1 flag is cleared and the f0 flag is set the fifth byte of the block is the start of the filler data, as illustrated in FIG. 7B.

The f4, f3 and f2 flag bits are dedicated to UMAC packet space processing, as discussed later in this specification.

An acknowledged LMAC data block contains UMAC packets (or portions of UMAC packets) data that require reliable communications support from the LMAC layer. The block body may also contain LMAC control packets and/or filler (all zeroes).

Figure 8C:
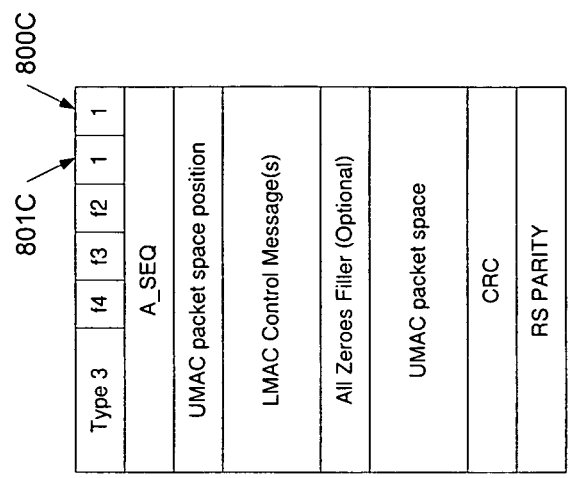
FIGS. 8A-C are illustrations of the structure of "Acknowledged UMAC data".
Figure 8B:
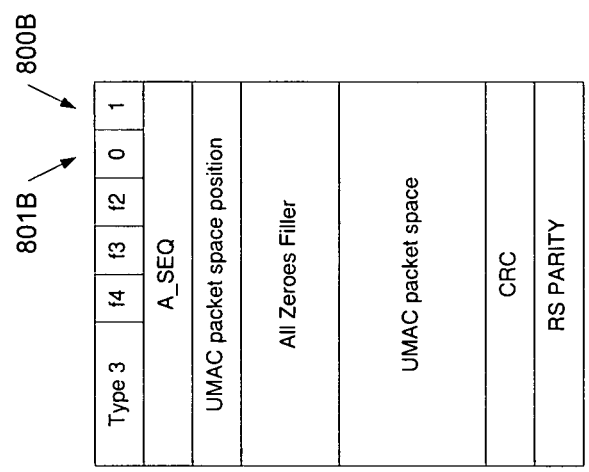
Figure 8A:
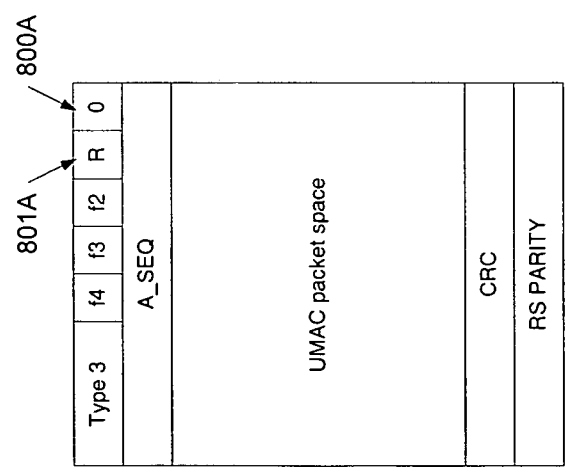

The structure of "Acknowledged UMAC data" is illustrated in FIGS. 8A-C. The second and third bytes of the block contain the acknowledgement sequence number, A_SEQ. This sequence number is used both in acknowledging blocks and in segmentation and re-assembly. It occupies a different sequence space than the U_SEQ space used in type 2 blocks (unacknowledged UMAC data). Data from a given UMAC packet may not be segmented into both type 2 and type 3 blocks.

Like in block type 2, the f0 (e.g. 800A-C) and f1 (e.g., 801A-C) flag bits indicate whether there is filler or control data in the block.

If the block body is filled solely with UMAC data, the least significant flag bit (f0) is cleared, see block 800A in FIG. 8A. When the f0 flag is cleared, the fourth byte of the block is the start of the UMAC packet space. If there is filler or control data in the block, the f0 flag is set, as shown in block 800B of FIG. 8B. When the f0 flag is set, the fourth byte of the block indicates the byte position in the block when UMAC packet space begins.

Block flag f1 indicates that there is LMAC control data in the block. The f1 flag may only be set if the f0 flag is also set, see FIG. 8C. If the f1 flag is set (i.e. 801C), the acknowledged UMAC block is filled with UMAC data, LMAC control message, and possible filler. The fifth byte of the block is the start of the LMAC control message field, as illustrated in FIG. 8C. If the f1 flag is cleared and the f0 flag is set the fifth byte of the block is the start of the filler data, as illustrated in FIG. 8B. The f4, f3 and f2 flag bits are dedicated to UMAC packet space processing.

The LMAC control messages may not be retransmitted as part of reliable communications, but the entire block may be retransmitted. If the block is being retransmitted and the LMAC control messages are obsolete, the f1 flag should be cleared. This indicates that the block contains filler data but no valid LMAC control messages (see FIG. 8B). The data does not actually need to be set to zero even though filler data nominally has all zeroes filler data. Additionally, it is possible to replace old LMAC Control data from a packet that failed to be transmitted with a new LMAC control packet. In this case, the f1 flag should remain set.

Block type 4 contains encapsulated type 3 blocks. In this case (i.e. type 4), the LMAC passes blocks of a specified format from the transmitter to the receiver. The block format is the combination of the size of the block and the number of Reed-Solomon parity bytes in the block. The LMAC block format may be changed while a Bearer is active. When the block format changes, the system may still contain blocks that were formatted with the old block size. The old blocks other than type 3 blocks are discarded or dropped. The old type 3 blocks, with the CRC and parity check bytes removed, are encapsulated in a new LMAC block. The type 4 format is identical to the type 3 format except that the UMAC packet space is replaced by encapsulated data space (see FIGS. 9A-C).

The type 4 blocks use the same sequence number set, A_SEQ, as the type 3 blocks, since both block types require acknowledgement. UMAC data may not cross between type 3 and type 4 blocks since they hold different types of data.

LMAC Process

The primary purpose of the LMAC layer is to provide transport for UMAC data. The transmitter generates a transmit bit stream from UMAC packets and from LMAC control messages (see FIG. 3). The receiver converts the received bit stream back to UMAC packets and LMAC control messages.

Referring back to FIG. 3, the first step in the transmit process is to create LMAC blocks (e.g. block 303). The LMAC blocks are created from the UMAC packets 301 and LMAC control messages 302.

When building each new block, the transmitter checks the ARQ Control for LMAC control messages. In one or more embodiments, LMAC control messages have the highest priority in the block creation process. For instance, if there are LMAC control messages, they are embedded in the front of the block or take up the whole block as needed. Once all the LMAC Control messages 302 have been converted to blocks, the transmitter makes blocks from UMAC packets 301. When the transmitter starts taking data from the UMAC packets, it takes all the data from the current packet before proceeding to the next packet. If no more data is available, fillers (or zeros) are inserted in the LMAC block before the UMAC data. Thus, the UMAC data is always at the end of the LMAC block, even if it doesn't fill the block.

All the blocks containing data from the UMAC packets are numbered for ARQ management and packet re-assembly at the receive module. If there are still type 3 blocks with old format in the system when the block format changes, the transmitter encapsulates those blocks to form new blocks to match the new block format.

Blocks with UMAC Packet Space

The transmit data from the UMAC is passed to the LMAC in UMAC packets along with attached data. The attached data specifies the priority, time to die (TTD), and NACK mode (i.e. error) flag of each UMAC packet. The attached data is used by the LMAC transmitter to schedule the transmission of the LMAC blocks. It may not be transmitted to the other end of the link.

The LMAC segments the UMAC packets and combines these segments with LMAC control messages to form LMAC blocks. The UMAC packet space in the LMAC block contains UMAC packets or segments of UMAC packets. The UMAC packets are broken into segments to fit into available space in LMAC blocks. The segments are placed into blocks in the order of sequence number, with the first segment going into the lowest sequence number and so on in order. Once the LMAC transmit process has started placing segments of a packet in blocks, it must finish processing that particular packet before placing segments from other UMAC packets into blocks.

Multiple segments from multiple packets may be included in a block—however packets in the same block should have the same NACK mode flag—and the first segment of a packet may start anywhere in the body of the UMAC packet space of the LMAC block. The LMAC block includes a byte indicating the start location of the first packet to start within that block (e.g. FIRST_PACKET_POS).

Figure 10B:
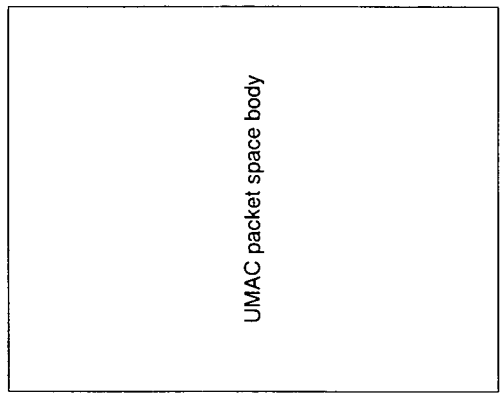
FIG. 10B is an illustration of a block containing no new UMAC packets.
Figure 10A:
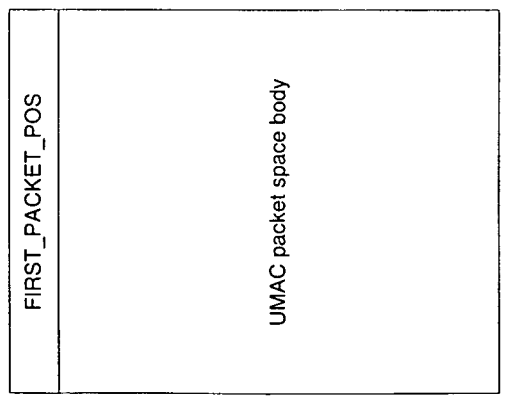
FIG. 10A is an illustration of a block containing new UMAC packets.

Each LMAC block that contains UMAC data includes a 16-bit sequence number, A_SEQ or U_SEQ depending on whether data is required to be acknowledged or not. The f4 flag in the LMAC header holds the Expiration Indicator (EI) associated with the packet that occupies the first segment of UMAC packet space of the block. As illustrated in FIG. 10A, setting the f3 flag indicates that a packet starts within the block and the first byte of the packet space holds FIRST_PACKET_POS, which indicates the position in the block where the first packet to start in the current block begins. The remaining UMAC packet space contains segments of UMAC packets. However, if f3 is not set, then no packet starts within this block but instead continue from the previous block. In this case, the first byte of the block contains the UMAC packet space body. (See FIG. 10B).

The f2 flag, if set, indicates that at least one UMAC packet ends in the current block. If f2 is cleared, then no UMAC packet ends in the block.

These aforementioned formatting and indications provide the receive LMAC process means to reliably determine where each UMAC packet ends and thus where the next UMAC packet starts. For instance, the receive LMAC may use the settings of f2, f3, and the UMAC packet length to determine the precise nature of the data.

Block with LMAC Control Message

There may be any number of LMAC control messages in a block, but LMAC control messages may not be segmented between blocks and may not be acknowledged or retransmitted. All LMAC control messages include a length field, a message header, and a body. The header includes a two-bit type field and six flag bit. The precise content of the flag and message body are a function of the message type. The length field gives the total length of the message in bytes. When using a 255 byte block length, an LMAC message can be up to 252 bytes long so that 1 (one) byte block is reserved for the header, and two bytes of CRC. No space for parity is required. Whatever the selected block length, it is desirable that the LMAC control message is formatted to fit in a block.

Figure 11:
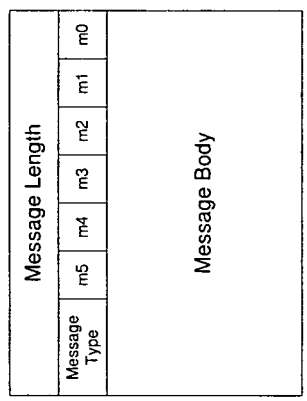
FIG. 11 is an illustration of an LMAC control message format.

There are several possible types of LMAC control messages, e.g., acknowledgements and expiration notices. An LMAC control message format is illustrated in FIG. 11. In this illustration, the Message Type field indicates the type of message. For instance, Message Type 0 (zero) is Acknowledgement and Message Type 1 (one) is Expiration Notice.

Acknowledgements, Message Type 0, are part of the ARQ mechanism. They are sent by the receiver of a block to indicate that the block has been received.

An acknowledgement message specifies the A_SEQ of a block, then a set of status bits indicating the status of that block and of the immediately preceding blocks for the duration of the message. The least significant bit of each byte corresponds to the more recent block.

The message can cover a number of blocks that is not a multiple of eight. The number of bits not used in the last byte of the message body (denoted N_unused) is indicated with flags m2, m1, and m0 (4*m2+2*m1+m0=N_unused) in the message header. The m4 flag indicates that the most recent block in this message (the block whose A_SEQ is specified) is the highest numbered block to be received. The m3 flag indicates that the oldest block in the message (corresponding to the last valid status bit) is the oldest block of interest (most likely the oldest missing block). The m5 flag indicates that this block's status bits have been compressed.

Figures 12A, 12B, 12C:
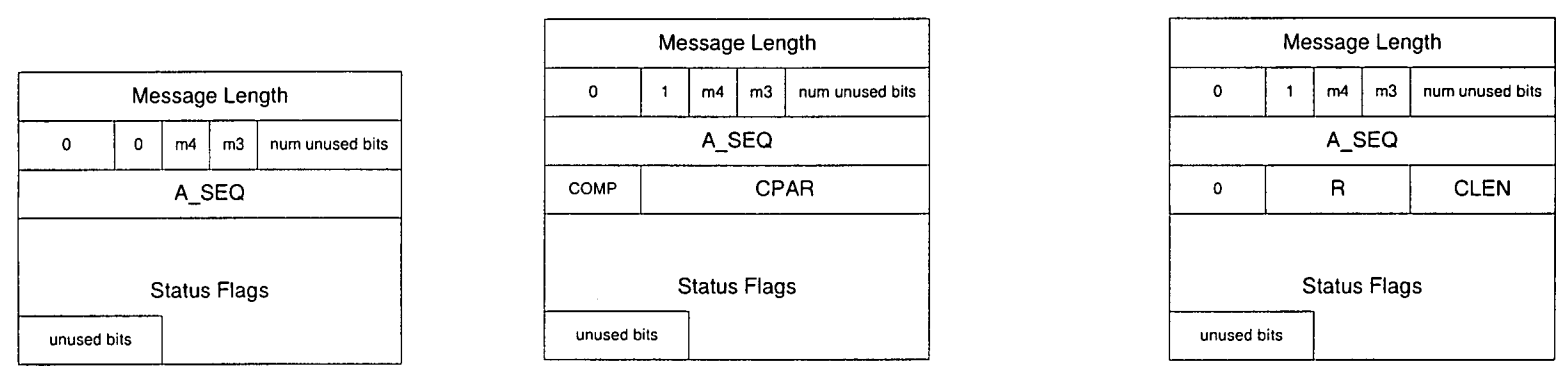

The two bytes after the message header field contain the acknowledged A_SEQ (see FIGS. 12A-C). If there is no compression, indicated with m5=0, the remaining bytes contain status flags, as illustrated in FIG. 12A. If there is compression, indicated with m5=1, the byte after A_SEQ contains the compression code (FIGS. 12B-C). This consists of a two-bit compression type field (COMP) and a six-bit compression parameter (CPAR).

The status of each block is indicated by a "0" if the unit sending the ACK requests a retransmission and is indicated by a "1" if no retransmission is requested. The least significant bit of the first status byte indicates the status of the packet with sequence number A_SEQ. The next to the least significant bit holds the status of the packet with sequence number A_SEQ-1 and so on. The status bits are written from LSB to MSB within bytes in general.

A common compression type to support is type 0, run length coding. See FIG. 12C for the format of the compressed acknowledgement message with run length coding. The run length coding is implemented by specifying a block status value and the number of sequential occurrences of that value. The CLEN bits indicate the number of occurrences minus one. CLEN is defined as the three LSBs of CPAR. The three MSBs of CPAR are reserved and set to zero.

Message Type 1—Expiration notices—are sent by the sender of blocks to the receiver to indicate that these blocks have expired. The expiration notices tell the receiver that it does not need to request re-transmission of a block (the status of that block should be "1", not needed for retransmission, if it is referred to in any further ACK messages) and that a block that may be stored in the receiver's LMAC memory can be deleted. When an UMAC packet expires (due to its TTD being exceeded before acknowledgement), expiration notices are sent for each block that holds a piece of that packet unless that block also holds a packet that has not expired yet. Expirations are sent based on A_SEQ.

Figures 13A, 13B:
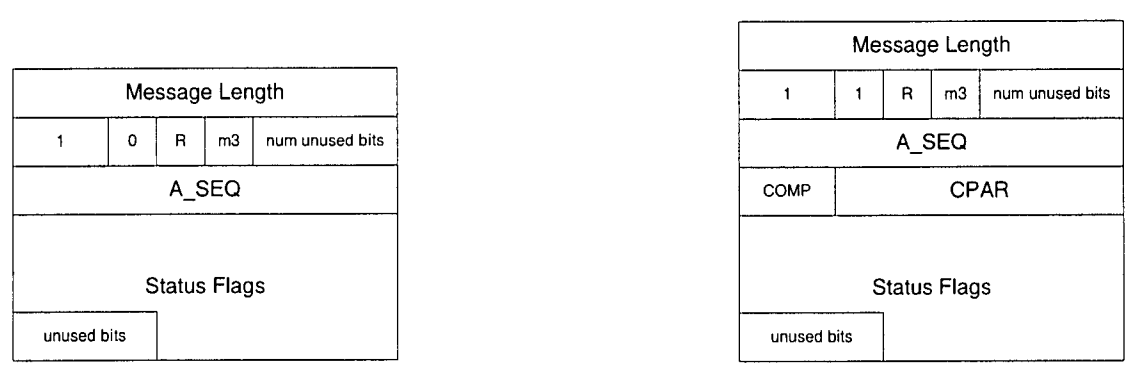

The format of the expiration notice message is the same as the format of the 10 acknowledgement message except for the m3 and m4 flags and the compression methods. The flag indicates that all blocks with a lower sequence number than the oldest block explicitly referenced in this message block have expired. (A block sequence number is considered "lower" if its sequence number is older than the latest received sequence number and older than the last referenced block.) As illustrated in FIG. 13A-B, the m4 flag is reserved and set to zero. 15 The status bits are set to a "1" if the referenced block has expired and set to if the referenced block has not expired.

Compression is used on the expiration notices as well as the acknowledgement messages, but compression methods are defined independently for these message types. (The same COMP indicator may result in different compression algorithms between acknowledgment messages and expiration messages.) FIGS. 13A-B show the format of the expiration message. FIG. 13A is for an uncompressed expiration message and FIG. 13B is for a compressed expiration message.

Block with Encapsulated Block Space

The encapsulated block space in a type 4 block may hold type 3 LMAC blocks that have a different block size from the current LMAC block size.

When the block format changes, the LMAC may contain unsent blocks in the old format. If the block body size changes, it may be necessary to encapsulate those old blocks in new blocks.

Figure 14:
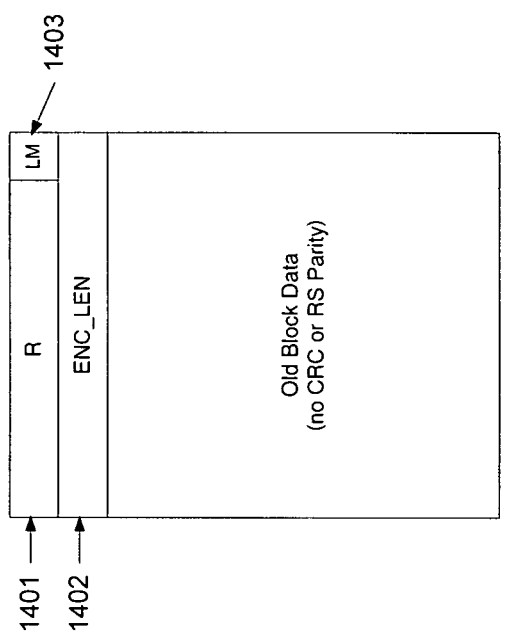
FIG. 14 is an illustration of the Encapsulated block format.

An encapsulated block may be created from a type 3 LMAC block by removing the CRC and parity bits and adding two bytes at the beginning to indicate the encapsulated block length (ENC_LEN). FIG. 14 is an illustration of the Encapsulated block format. The least significant bit, LM 1403, of the first byte of ENC_LEN (i.e. block 1401), times 256 plus the entire second byte of ENC_LEN (i.e., block 1402) defines the length of the encapsulated block including ENC_LEN. The remained of the first byte is reserved (i.e. "R") and set to zero.

The encapsulated block segmentation process is similar to the UMAC packet segmentation process, except that the space holds encapsulated blocks instead of UMAC packets.

Figure 15B:
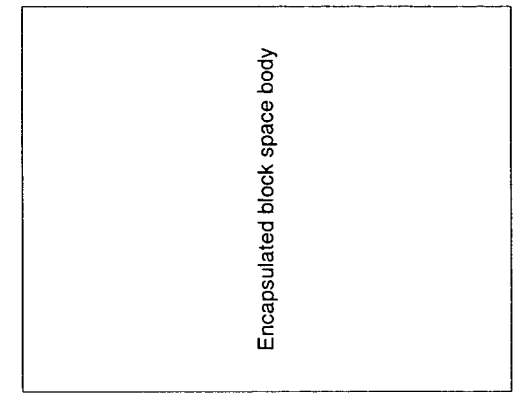
FIG. 15B is an illustration of a block containing no new encapsulated blocks.
Figure 15A:
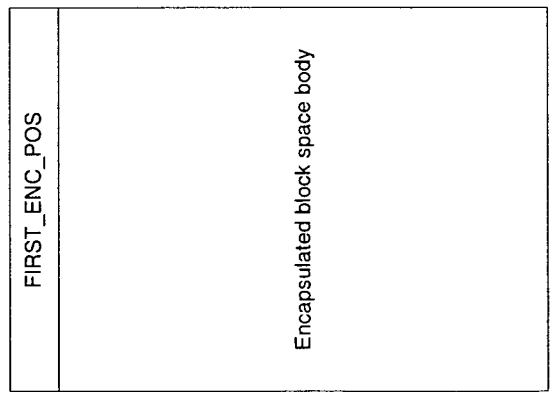
FIG. 15A is an illustration of a block containing new encapsulated blocks.

The f4 flag holds the EI (Expiration Indicator) of the first UMAC packet in the block. It is set if the first packet in the encapsulated block has expired. The f3 flag, if set, indicates that an encapsulated block starts within the block and the first byte of the encapsulated block space holds FIRST_ENC_POS, which indicates the position in the LMAC block where the first encapsulated block begins. See FIG. 15A. The remaining encapsulated block space contains segments of encapsulated blocks. If f3 is not set then no encapsulated block starts within this block but instead continue from the previous block. In this case, the entire encapsulated block space contains segments of encapsulated blocks. (See FIG. 15B).

The f2 flag, if set, indicates that at least one encapsulated block ends in the current block. If f2 is cleared, then no encapsulated block ends in the block.

LMAC ARQ Control

The LMAC ARQ control manages the ARQ operations: to track the status of each transmitted and received LMAC block and to generate LMAC control message to assist the re-assembly process at the receiver as well as the re-transmission process.

The LMAC monitors the life of each UMAC packet based on its TTD. When a UMAC packet expires, the EI indicator bit in the data header of this UMAC packet changes from 0 to 1. If the NACK mode flag of this expired UMAC packet is set, the LMAC notifies the UMAC of the expiration of this particular UMAC packet specified with its packet ID (PID). When every EI bit of each UMAC packet contained in a block is set to 1, this block itself expires. When a transmit block has expired, the LMAC transmitter deletes the block and generates an expiration notice within a certain time frame. The expiration notice, possibly along with other LMAC control messages, may be converted to an LMAC block with or without UMAC data and transmitted to the receiving PLN in a timely fashion. Upon receipt of the expiration notice, the ARQ Control on the receive end instructs the LMAC receiver to delete the block as well as all other blocks that entirely contain the expired UMAC packet(s). Meanwhile, the LMAC receiver stops asking for the retransmission of these expired blocks.

The LMAC receiver may keep tracking the receive status of type 3 and type 4 blocks, whether they are successfully received or not (the CRC check failed or not). The ARQ Control on the receive end may generate an acknowledgement message for received type 3 and type 4 blocks periodically. The transmitter of the receiving PLN may convert the acknowledgement message, possibly along with other LMAC control messages, to an LMAC block with or without UMAC data and transmits it to the other side in a timely fashion. Upon receipt of the acknowledgement message, the LMAC which transmitted the original type 3 and type 4 blocks schedules the retransmission of any of these blocks that are not marked with the NACK erroneous) indicator and have not expired yet.

The order of transmission of each LMAC block may be based on several factors. For instance, whether the block contains LMAC control message(s) or not; whether the block is first transmitted or not; the number of times the block has been retransmitted; the priority of the block itself, (the block priority is equal to the priority of the UMAC packet in the block with the highest priority); and the TTD of the block.

Considering the above factors, embodiments of the present invention allow for flexible scheduling of transmissions. Thus, scheduling may be implementation specific but, it is desirable to have some guidelines such as:

1) The blocks that contain LMAC control messages should have the highest priority;
2) Blocks waiting to be transmitted should be more important than those waiting for acknowledgement;
2) A block with a smaller number of retransmissions since it was last NACK'd or since it was created should have a higher priority than those with a larger number of retransmissions;
4) The higher the priority of the block itself, the more important; and
5) Blocks with shorter life expectancy get preference.

After considering the above rules, if scheduling results in several blocks having the same priority, then the block created the earliest should have the highest priority. By implementing this first come first served rule, blocks are transmitted in the order in which they arrived at the LMAC in the first instance.

Finally, if there are no blocks of type 1-4 available at any time in the transmit process, the transmitter may create and transmit null blocks instead.

Additional LMAC Functions

Referring back to FIG. 3, the LMAC transmitter provides additional functionality in addition to its transport functionality. For instance, insertion of checksums for block-based error detection (CRC Encoding block 304); insertion of parity check bytes for Reed-Solomon based forward error correction and error erasure (block 305); interleaving of blocks to spread the effect of impulsive impairments (block 306); and Scrambling (block 307).

Cyclic Redundant Checksum

A cyclic redundant checksum may be generated for each LMAC block to enable error detection. Two bytes per LMAC block may be allocated to the CRC check bits, for example.

These bits may be computed from all data in an LMAC block except for the Reed-Solomon parity check bytes, e.g., the first (BLK_SZ−RS_PAR−2)*8 bits of an LMAC block, using the equation:

$$crc(D) = M(D)D^{16} \bmod G(D)$$

where
$M(D) = m_0 D^{k-1} + m_1 D^{k-2} + \ldots + m_{k-2} D + m_{k-1}$, is the message polynomial,
k=(BLK_SZ−RS_PAR−2)*8,
$G(D) = D^{16} + D^{12} + D^5 + 1$, is the CRC generating polynomial,
$crc(D) = c_0 D^{15} + c_1 D^{14} + \ldots + c_{14} D + c_{15}$, is the check polynomial,
and D is the delay operator.

That is, the CRC is the remainder when $M(D)D^{16}$ is divided by G(D). Each byte may be passed to the CRC(D) equation's least significant bit first, starting from the header byte of each block. The 16 CRC check bits are transported in the $(BLK\_SZ-RS\_PAR-1)^{th}$ and the $(BLK\_SZ-RS\_PAR)^{th}$ bytes of each block, with the least significant bit first. This procedure is followed by the FEC procedure.

Forward Error Correction

The RS_PAR redundant check bytes $c_0, c_1, \ldots, c_{RS\_PAR-2}$, $c_{RS\_PAR-1}$ may be appended to K=(BLK_SZ−RS_PAR) message bytes $m_0, m_1, \ldots, m_{K-2}, m_{K-1}$ to form a Reed-Solomon codeword, or an LMAC block, of size BLK_SZ bytes. The check bytes may be computed from the message byte using the equation:

$$C(D) = M(D)D^{RS\_PAR} \bmod G(D)$$

where
$M(D) = m_0 D^{K-1} + m_1 D^{K-2} + \ldots + m_{K-2} D + m_{K-1}$, is the message polynomial,
$C(D) = c_0 D^{RS\_PAR-1} + c_1 D^{RS\_PAR-2} + \ldots + c_{RS\_PAR-2} D + c_{RS\_PAR-1}$, is the check polynomial,
and $$G(D) = \prod_{i=0}^{RS\_PAR-1} (D - \alpha^i)$$

is the generator polynomial of the Reed-Solomon code.

The arithmetic is performed in the Galois Field GF(256), where α is a primitive element that satisfies the primitive binary polynomial $x^8 + x^4 + x^3 + x^2 + 1$. The message bytes may be passed to the C(D) equation sequentially starting with the header byte first. The resulting LMAC block may then be passed to the interleaver buffer for the interleave process.

If the Reed-Solomon block size is less than 255 bytes, the block may be shortened by setting the oldest bytes (the highest order bits in the polynomial) in the codeword to zero. The bytes that are set to zero are not transmitted; they are used only to compute the Reed-Solomon parity symbols.

Interleaver

Figure 16:
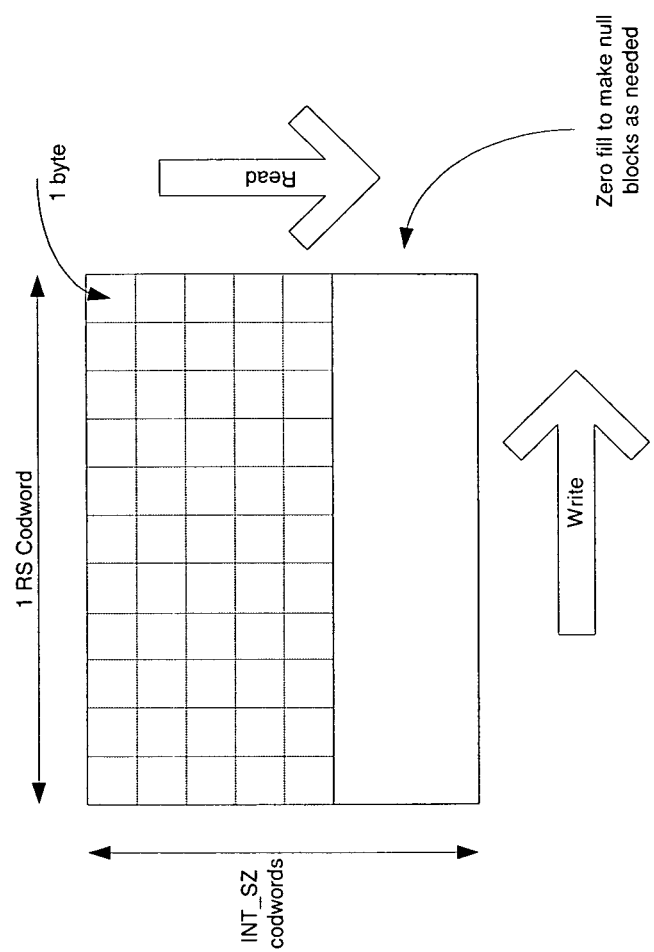
FIG. 16 is an illustration of an Interleaver in accordance with an embodiment of the present invention.

The Reed-Solomon codewords (LMAC blocks) in the interleaver buffer may be interleaved with a block interleaver that spans an integral number of Reed-Solomon codewords from 1 (no interleaving) to 256 as specified by the parameter INT_SZ, the interleave depth. FIG. 16 is an illustration of an Interleaver in accordance with an embodiment of the present invention. In this illustration, data is read into the interleaver in rows and read out in columns, byte-by-byte, where the number of columns is BLK_SZ (i.e. size of each RS Codeword) and the number of rows is INT_SZ. Note that for synchronization purpose, it may be necessary not to interleave data between Frames.

In one embodiment, the number of LMAC blocks in a Frame is an integer. Let FRM_SZ denote the bit capacity of a Frame. Let $$K = \left\lfloor \frac{FRM\_SZ}{BLK\_SZ \times INT\_SZ} \right\rfloor \times INT\_SZ,$$

$$M = \left\lfloor \frac{FRM\_SZ}{BLK\_SZ} \right\rfloor - K,$$

and $$L = FRM\_SZ - (K+M)*BLK\_SZ,$$

where K, M and L are integers with K and M in blocks and L in bits.

If M=0, then all the K LMAC blocks may be interleaved with the interleave depth INT_SZ. If M>0, the first (K−INT_SZ) LMAC blocks may still be interleaved with the interleave depth INT_SZ. For the next (INT_SZ+M) blocks, one embodiment divides these (INT_SZ+M) blocks into two segments, and interleaves the first segment of $$N = \left\lceil \frac{INT\_SZ + M}{2} \right\rceil$$

blocks with interleave depth N and the second (INT_SZ+M−N) blocks with interleave depth (INT_SZ+M−N).

Figure 17:
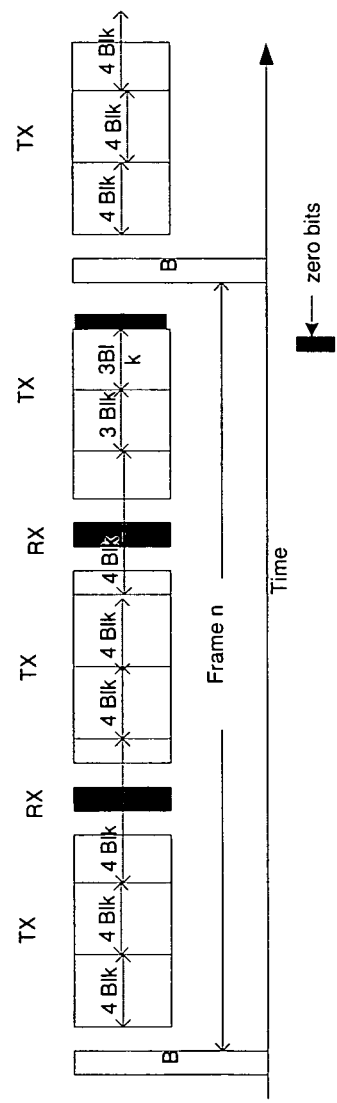
FIG. 17 is an illustration of example interleaving process.

The last L bits in a Frame may be filled with zeros. The filling of these L zero bits can be implemented by appending L bits of zeros at the end of the interleaved stream of each Frame. FIG. 17 is an illustration of an example interleaving with INT_SZ=4 and FRM_SZ=30*BLK_SZ*8+L, where L is less than BLK_SZ*8.

Scrambler

Figure 18:
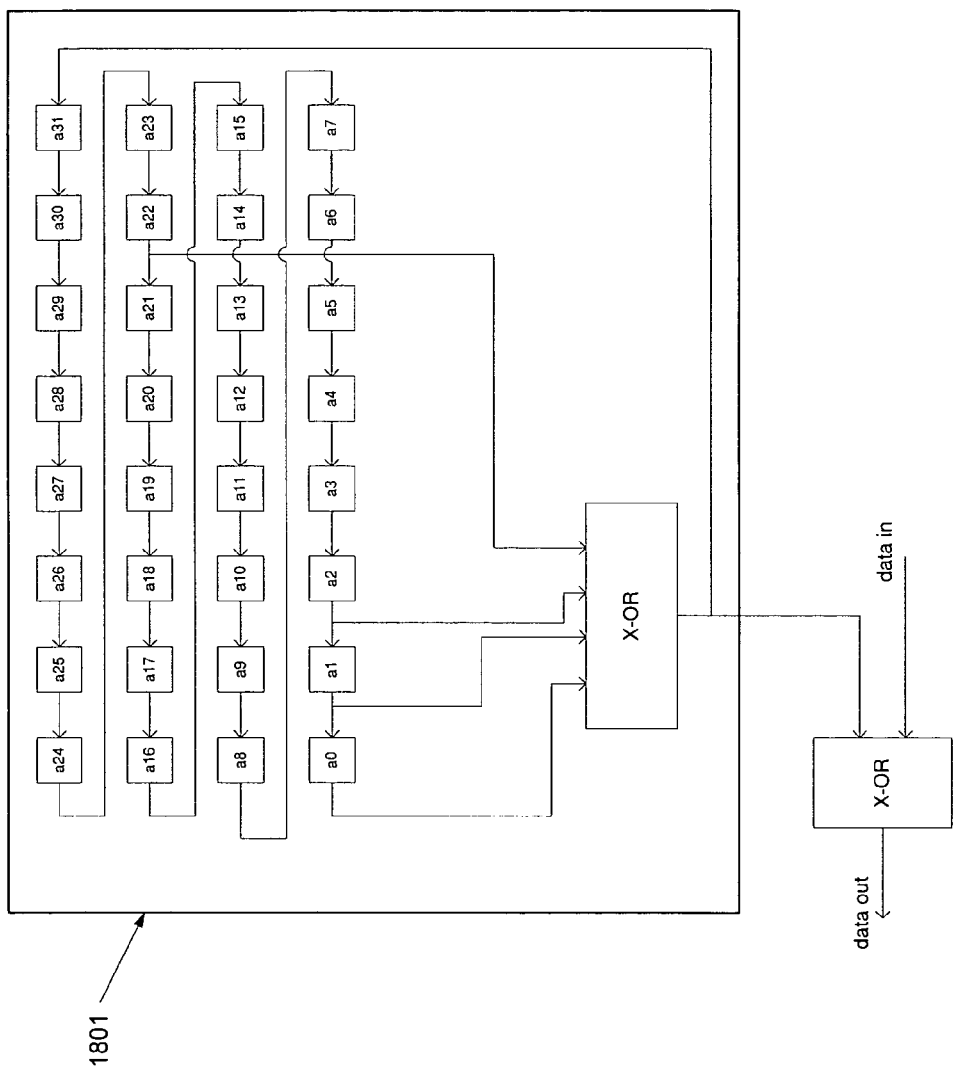
FIG. 18 is an illustration of a possible implementation of a Scrambler.

Each output byte of the interleaver may be passed to the scrambler 307 (see FIG. 3), with the least significant bit of the byte first and most significant bit last. In one embodiment, the scrambler does an exclusive-OR of each input bit with a cover sequence, for a total of FRM_SZ bits per Frame. The cover sequence is computed from a 32-bit shift register. At the start of each Frame the cover sequence is initialized with a 32-bit value stored in a register, for example. This sequence may be the network ID exclusive-OR'd with all ones (0xFFFFFFFF). A possible implementation of a Scrambler is illustrated in FIG. 18. In this illustration, the 32-bit shift register 1801 implements the polynomial:

$X^{32}+X^{22}+X^2+X+1$.

The input bits (which may be the output bits of the interleaver) are passed to the scrambler as "data in". The variables "a0" to "a31" in the shift register may be initialized with bits zero (0) to thirty one (31) of the cover sequence. The output bits of the scrambler, "data out", are passed to the Transmit PHY 308 for transmission on the media.

The Upper MAC

The Upper MAC (UMAC) 130 layer operations are classified into control and data plane operations. (See FIG. 1). In the data plane, the UMAC is responsible for multiplexing data from Connections (Traffic Logical Channels) onto Bearers (Traffic Physical Channels). In the control plane, the UMAC maps logical control channels onto physical channels. In addition, the UMAC relays timing and synchronization information from the LMAC and PHY layers to the Transport Layer (TL) 120, where it is used to synchronize the operation of applications such as Audio/Video (AV) and other isochronous (i.e. requiring timing coordination) applications needing an accurate timing reference.

Figure 19A:
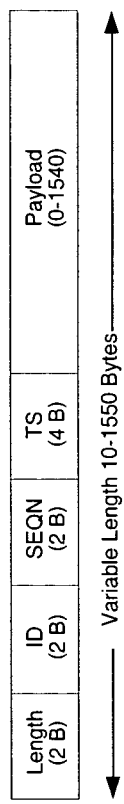
FIGS. 19A-B are illustrations of the structure of UMAC messages.
Figure 19B:
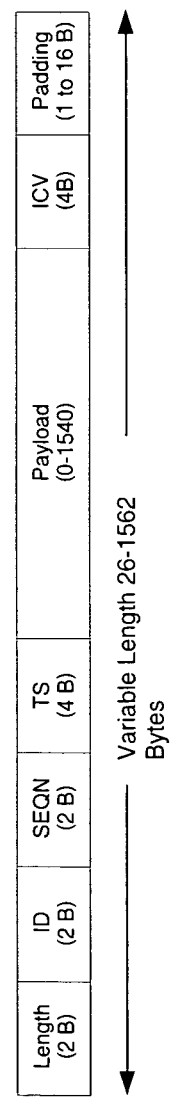

FIGS. 19A-B are illustrations of the structure of UMAC messages. FIG. 19A illustrates UMAC Message Format if Encryption is not Used, while FIG. 19B illustrates UMAC Message Format if Encryption is Used. Both control messages (MEntries) and TL application data are encapsulated in UMAC messages with the same format.

As illustrated in FIG. 19A, if encryption is not used, the UMAC does not modify the contents or format of TL messages that belong to Connections. The Length, ID, SEQN number, and TS fields in the TL messages become the corresponding fields of the UMAC message. If encryption is used, the UMAC modifies the Length field of the TL message to reflect that integrity check value and padding are added. The ID, SEQN number, and TS fields are unchanged.

For control information flowing over a Control Logical Channel (DCLCh or DDLCh) however, the UMAC constructs a UMAC message around the MEntry in the format shown in FIG. 19A when encryption is not used, and in FIG. 19B when encryption is used.

The UMAC message comprises the following fields:

Length: A two byte field specifying the number of bytes in the message, including the length bytes themselves. The range of values of the length field is 10 to 1550 bytes if encryption is not used, and is 26 to 1562 bytes if encryption is used.

Identifier (ID): A two-byte field that identifies the upper layer Connection for the message payload. The most significant 4 bits of the ID constitute the ID type. The following 12 bits identify specific Connections or Logical Control Channels (DDLChs or DCLChs). Example Identifier values for Connections and Control Channels are given in FIG. 20. If the UMAC message encapsulates a TL message, the ID field is the same as the CID field in the TL message. If the UMAC message encapsulates a control message, the ID field is set as provided in FIG. 20.

SEQN (Protocol Sequence Number): Is a two-byte sequence number. TL messages contain the SEQN field and this field is left unmodified in the UMAC message. Note that this sequence number is associated with the ID and that the SEQN is unique only across messages containing the same ID. For control messages, the UMAC appends a two-byte sequence number field. In this case the sequence number may be unique only across messages containing the same ID.

TimeStamp (TS): The UMAC appends a time stamp every time a UMAC message is created from a Control message. The TS in the TL messages is not modified.

Payload: This field contains the encapsulated message from the higher layers (BM, CM or TL). The maximum length of the payload is 1540 bytes.

ICV (Integrity Check Value): This field is present only when encryption is used. It is the cyclic redundancy check calculated over the bytes that are encrypted.

Padding: This field is present only when encryption is used. One to 16 bytes of known values are added to make the total length of the data to be encrypted a multiple of 16 bytes.

UMAC Operations

The UMAC maps Connections onto Bearers (i.e. physical channels). Each Connection may be allocated an exclusive Bearer by the CCo or a single Bearer may carry multiple Connections. The CBWM (Central Bandwidth Manager) function in the CCo determines whether to multiplex Connections when a Connection is first established, based upon the QoS requirements of the new Connection and the QoS requirements of any existing Connections as specified in the CSPECs (Connection Specification is the set of parameters that define the traffic characteristics and QoS requirements of the Connection). If the QoS requirements of two Connections are compatible, the two Connections may be multiplexed onto a single Bearer. The UMAC forwards messages belonging to a particular Connection to the Bearer LMAC associated with the Bearer assigned to the Connection by the CCo.

Bearers in embodiments of the invention are Physical Channels between a single source PLN and a single destination PLN. A Multicast Connection may be supported using multiple Bearers from the source PLN to destination PLNs in the MCAST group. The MCAST group is the set of TEIs of the destination PLNs for a multicast Connection. In response to a Connection Establishment request from the source PLN, the CBWM in the CCo establishes a Bearer from the source PLN to every PLN in the MCAST list specified by the source PLN at the time of the Connection Establishment request.

The UMAC maintains the mapping of a multicast Connection to the multiple Bearers established by the CBWM to support the multicast Connection. The UMAC replicates all UMAC messages—created from TL messages carrying application data and Control messages (MEntries)—onto every Bearer supporting the multicast Connection. After replication of UMAC messages, the UMAC handles data transmission on each Bearer in the same manner in which unicast Connections are mapped to Bearers. There is one instance of the LMAC associated with each Bearer in the set of Bearers established to support a single multicast Connection. The UMAC provides the LMAC in each Bearer the required time to die and packet priority information, as the UMAC does for unicast Connections.

TL messages carrying application data belonging to broadcast Connections are routed to the Broadcast LMAC (B-LMAC) for transmission on a dedicated BrPCh. The BrPCh is established by the CBWM in response to a request for bandwidth message. The UMAC is aware of the allocation and timing of the BrPCh and delivers UMAC messages, containing the application payload, to the B-LMAC for transmission on the BrPCh. The B-LMAC may not support a segmentation and re-assembly function. Hence, the UMAC must ensure that the BrPCh is large enough to carry the UMAC messages, containing the broadcast application data, before handing it to the B-LMAC.

MEntries received from the CM, BM and the Coordinators are encapsulated in UMAC control messages. The UMAC assigns MAC priorities to these control messages based on the MType of the MEntry and queues them. One embodiment of the invention provides the flexibility of routing MEntries over different physical channels, i.e., the logical control channels may use more than one Physical channel. If a Bearer exists to carry DDLCh or DCLCh control messages then the UMAC must route UMAC control messages to the corresponding Bearer LMAC. If such a Bearer does not exist for DCLCh messages, the UMAC may route the messages to the B-LMAC.

Since DDLCh MEntries are sent on Bearers, the UMAC forwards UMAC messages with such MEntries to the corresponding Bearer LMAC. DCLCh MEntries may use Bearers or they may use broadcast channels including BePCh, CoPCh and BrPCh. Therefore the UMAC decides to route such MEntries to the broadcast LMAC (B-LMAC) or to a Bearer LMAC between the CCo and the PLN, if such a Bearer exists.

The UMAC maintains Frame configuration information—including Frame timing and allocations for Bearers assigned to control channels—and allocations for broadcast channels including BePCh, BrPCh and CoPCh. The UMAC knows the maximum size of the payload that may be carried by a broadcast opportunity. The B-LMAC may not support segmentation and re-assembly. Thus, when a broadcast opportunity arises the UMAC may pass a number of UMAC control messages to the B-LMAC. The UMAC ensures that the combined size of the control messages passed does not exceed the size of the allocation for the broadcast channel. The UMAC delivers the messages in strict priority order and in order within a priority. Note that UMAC messages containing broadcast TL messages with user data may also be managed by the UMAC and that these messages may be multiplexed with UMAC control messages onto broadcasts over BrPCh channels.

The UMAC maintains Frame configuration information. Hence the UMAC is aware of the size and Slot allocation for CoPCh opportunities. However, the UMAC determines if UMAC messages may be transmitted over a CoPCh according to the Slotted ALOHA protocol. If UMAC messages may be transmitted over the CoPCh, the UMAC forwards the messages to the B-LMAC. If not, the UMAC buffers the messages and awaits the next broadcast opportunity.

Figure 21:
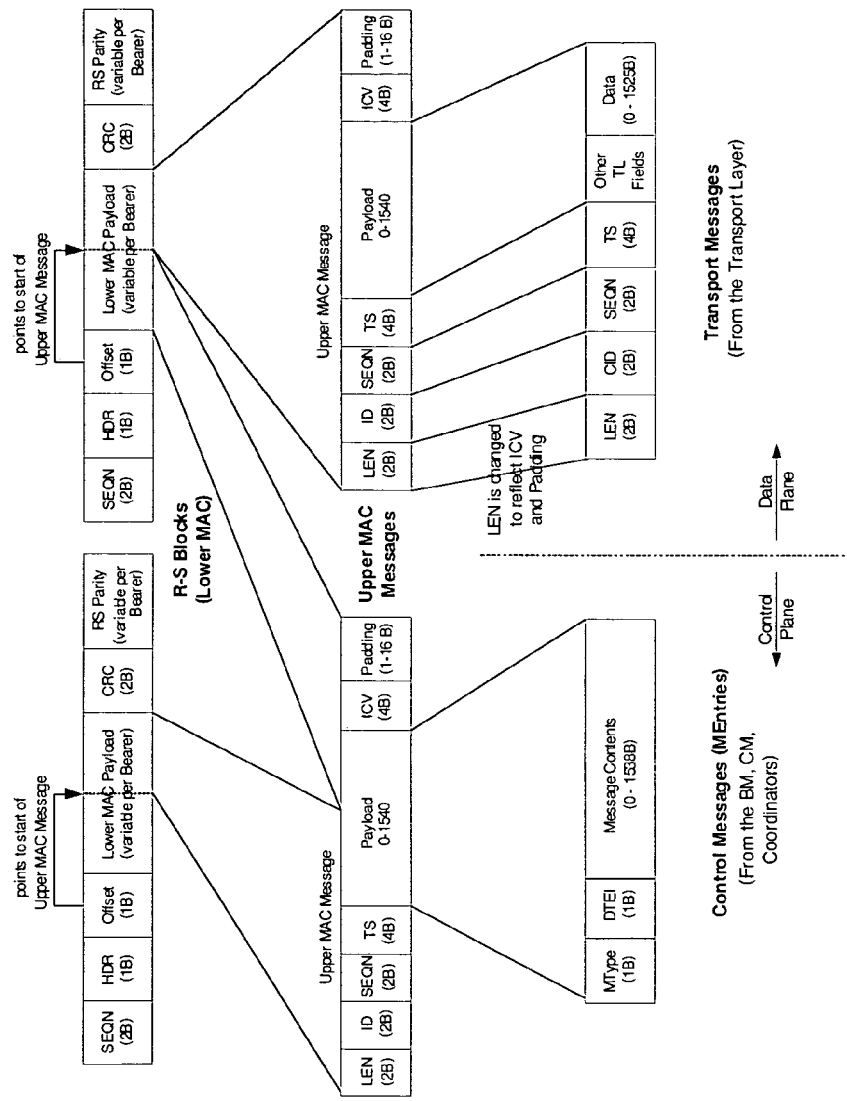
FIG. 21 is an illustration of the relationship between the UMAC messages and the LMAC blocks.

FIG. 21 shows the relationship between the UMAC messages and the LMAC blocks. Note that a block may contain part of a UMAC message, one or more entire UMAC messages or a mix of partial and complete UMAC messages subject to the constraint that fragments of UMAC messages must not be intermixed. The LMAC uses the length information contained in the UMAC message, as well as its own offset information to reconstruct received UMAC messages.

FIG. 21 also illustrates the multiplexing of data from the TL and MEntries (control messages) from the CM, BM and Coordinators. It also shows the relationship between Message formats at different protocol layers. The UMAC adds the control channel ID field to MEntries from the BM, CM or the Coordinator functions. The ID field uniquely identifies the source PLN of the data contained in the message. At the receiver, the UMAC uses the ID (as well as the MType for MEntries) to route data and control messages to the appropriate upper layer protocol. Connection IDs are routed to the TL and other IDs are routed to entities in the Control Plane. The specific control entity receiving a particular MEntry is determined from the MType field in the MEntry.

The UMAC may not perform segmentation and re-assembly of messages from the upper layers, SAR is performed in the LMAC. The UMAC may assume that the LMAC provides prioritized transmission of the UMAC messages (this is critical to ensure that control messages are not excessively delayed by data message transmission).

The UMAC provides in-order delivery of messages to the control entities (BM, CM and Coordinators), and to any Connection that requires it (as defined by the Connection's CSPEC). The TL may not require in-order delivery of received messages for AV applications, so the UMAC may deliver received AV TL messages in the order they are received. However, other TL applications such as IP may request in-order delivery of messages from the UMAC to the TL at the receiver. The Control Information and other fields (e.g. those specifying functions required from the protocol layers handling control channels) contain sub-fields indicating whether the receiving side UMAC should provide in-order delivery of messages belonging to a particular Connection or Logical Control Channel.

On the receiving side, the UMAC computes the Time to Die (TTD) for each received UMAC message based on the Time Stamp in the message and the delay specified in the Control message specification or in the Connection specification. The UMAC receives complete messages from the LMAC. It maintains a set of (logical) queues, one associated with each ID. Each message is placed in the appropriate queue in order of its sequence number. Messages received in-sequence are immediately delivered to their destination. If in-order delivery is requested, when messages are received out of sequence, they are buffered in the queue until their TTD is reached. If the out-of-sequence message is not received before the termination of the TTD, the buffered messages may be delivered to their destination out of sequence. The message re-ordering function is accomplished using the SEQN field of the UMAC message.

Message lifetimes (i.e. time-to-die values) for application data in TL Messages are computed by the UMAC and indicated to the LMAC on the transmit side based on the delay specified in the CSPEC and the timestamp in the TL message. The lifetimes for control messages are computed based on the Time Stamp and the delay specified in the Control Channel Specification. This information is included in the UMAC-LMAC primitive (and thus transferred to the LMAC along with each message); it may not be transmitted explicitly over the wire interface.

The UMAC provides prioritized transmission of UMAC messages on Bearers and Broadcast Channels. In one embodiment, eight MAC priority levels are defined, from 0 (lowest priority) to 7 (highest priority).

MAC Priorities are not to be confused with the priorities defined for the Priority Aperiodic Grant Service (PAGS) Connections. MAC priorities are used to determine priority when multiple Connections and/or Control Channels are multiplexed onto a single Bearer. MAC priorities for control messages (MEntries) are also used to determine the order in which the MEntries are transmitted over broadcast PHY channels (BePCh, CoPCh or BrPCh) and whether control or user broadcast messages are sent over a BrPCh.

Connection Priorities for PAGS schedulers are used by the CBWM in allocating bandwidth to PAGS Connection requests and bandwidth requests from PAGS Connections.

For traffic on a Bearer, the CCo assigns the MAC priority level for each Connection or Control Channel at the time the Connection/Control Channel is established. The UMAC retains the priority information for active Connections so that it can indicate the priority of each transmitted message to the LMAC. The CCo may dynamically modify the relative MAC priority of active Connections when a new Connection is established. The UMAC forwards the priority level of each message to the LMAC, along with the message itself in the UMAC-LMAC primitive. The LMAC uses these priority levels to determine the order in which UMAC messages are packed into LMAC blocks and transmitted on a single Bearer. The UMAC implements strict prioritization in forwarding messages to the LMAC based on the assigned MAC priorities. That is, if two messages are ready to be passed to the LMAC, the UMAC sends the higher priority message first. If two messages with the same priority are ready at the UMAC/LMAC interface, they are passed to the LMAC in FIFO order.

For MEntries, the UMAC may use high priorities such as 6 and 7 based on the MType of the MEntry. The UMAC uses these priority levels to determine the order in which MEntries are sent to the Broadcast-LMAC (B-LMAC) or to the Bearer LMAC.

Partial ACK Procedure

UMAC messages transmitted over a Bearer are reliable because of ARQ in the LMAC. A Partial ACK procedure is defined to improve reliability of broadcast transmissions of messages since the B-LMAC may not support ARQ.

The Partial ACK procedure requires every PLN transmitting over a broadcast channel to acknowledge the previous broadcast channel transmissions in the current and preceding frames. All transmissions over any of the Broadcast Channels (BePCh, BrPCh and CoPCh) are acknowledged. The procedure is called 'Partial ACK' because the broadcast transmissions are acknowledged by any PLN using subsequent broadcast channels and not necessarily by any of the intended destination PLNs. Partial ACK allows for a more rapid acknowledgment of CCo broadcast transmissions. The first PLN that gains access to a broadcast opportunity (including the CoPCh) will acknowledge transmissions from the CCo that may have contained messages addressed to multiple PLNs.

Transmitted UMAC BCAST messages that have not been acknowledged with the Partial ACK bits at the next opportunity for an acknowledgement will be queued for retransmission. UMAC BCAST messages transmitted in a broadcast opportunity may not be discarded until they are older than their time-to-die threshold or are specifically acknowledged (positively) by their destination PLN. If a positive Partial ACK is not received from any PLN before the expiration of the UMAC BCAST message or if a particular destination PLN sends a negative ACK, the message is retransmitted. Partial ACK bits are set to 0 (zero) in case of bad reception (CRC check fails). The Partial ACK bit is set to 1 (one) in case of accurate message reception.

Timing and Synchronization Functions

The UMAC layer of the protocol stack is responsible for distributing timing and synchronization information to all PLNs within the network. This information is used by the UMAC layer itself (e.g. to synchronize transmissions over the wire), as well as by the TL (e.g. to synchronize playback of AV data).

PLNs within the network synchronize to Beacons transmitted by the CCo over the BePCh. They track the timing of these transmissions, and divide the Frame into Slots based upon the derived timing.

In addition, the timing tracking functions generate a clock (e.g. 1 MHz) that is used to provide precise synchronization of signals across the network. This clock may be used to generate a 28-bit Time Synchronization Function (TSF) value that is passed from the UMAC to the TL, for example. The TL uses the TSF to synchronize playback of AV data. The 28-bits TSF may be constructed as shown in FIG. 22.

Encryption

When encryption is enabled (on a per Connection basis), the UMAC may encrypt part of the UMAC message using, for example, Advanced Encryption Standard with the Rijndael algorithm (AES) with a 128-bit key.

The UMAC header (i.e. the Length, ID, SEQN, and TS fields) are not encrypted. If the UMAC message encapsulates a control message, then the bytes that are encrypted are the entire Payload field, and the ICV (Integrity Check Value) and Padding fields.

If the UMAC message encapsulates a TL message, then the bytes that are encrypted are the TL payload (i.e. not including the TL header) portion of the Payload field, and the ICV and Padding fields.

The PLN Key (e.g. a manufacturer's key) may be used to encrypt the Associate Message when a PLN first joins the network. The CCo distributes the Network Key to the new PLN through the Associate Process. The Network Key is used by all PLNs to encrypt application data over Connections or control data over Control Channels.

Integrity Check Value

The Integrity Check Value (ICV) is a 32-bit cyclic redundancy check calculated over the bytes that are encrypted, prior to encryption. This field is appended to the payload of the UMAC message.

After decryption and removal of the padding, receiving PLNs compute the 32-bit ICV. If any transmission error is detected, the message is discarded.

Padding

The number of bytes encrypted should be divisible by a fixed number, in one embodiment by 16. The UMAC pads the portion of the message to be encrypted—which includes part or all of the UMAC Payload and the ICV—so the length is a multiple of 16 bytes.

The Length field in the UMAC message reflects the total number of bytes in the UMAC messages including the ICV and padding bytes.

What is claimed is:

1. A method, implementable on a transmitter, for preparing data blocks for physical transmission over a physical channel on a noisy shared medium, the method comprising:
   segmenting a sequence of concatenated, variable length data packets into one or more of said data blocks of a fixed size currently defined for said physical channel, wherein at least one of the data blocks contains more than one packet;
   adding an indication to a data block of a start location within said block of a next packet at least to indicate to a receiver of said block where a next packet starts;
   providing said data blocks at least for encoding and said physical transmission onto said noisy shared medium; and
   managing said data blocks for possible retransmission.

2. The method according to claim 1 and wherein said segmenting comprises padding said sequence.

3. The method according to claim 1, wherein said packets are formatted packets.

4. The method according to claim 1, wherein said providing comprises adding CRC error detection coding to said data blocks.

5. The method of claim 4, and also comprising Reed-Solomon encoding of each of said data blocks.

6. The method of claim 1, wherein said packets comprise at least one of: application data and control messages.

7. The method of claim 6, wherein said segmenting comprises:
   segmenting said control messages;
   segmenting said application data;
   placing said segmented control messages into one or more of said data blocks; and
   placing said segmented application data into a remainder of said data blocks.

8. The method of claim 6, wherein said segmenting comprises:
   segmenting said control messages;
   segmenting said application data;
   placing said segmented control messages into one or more of said data blocks; and
   placing said segmented application data into one or more other data blocks.

9. The method of claim 1, and wherein said managing comprises numbering each said data block for Automatic Repeat Request (ARQ) management and packet re-assembly.

10. The method according to claim 1 and wherein said noisy shared medium is a powerline.

11. A method implementable on a receiver, for receiving data blocks from a noisy shared medium, the method comprising:
    receiving a sequence of said data blocks from said noisy shared medium, said data blocks being of a fixed size currently defined for a physical channel, wherein at least one of the data blocks contains more than one packet;
    reading formatting of each of said data blocks to determine, if present, a start location of a new packet;
    adding data before said start location to a previous packet currently in reassembly;
    reassembling a new packet from said start location irrespective of the assembly status of the previous packet; and
    if a data block was received with an error, waiting for its retransmission to finish assembly of the packet to which it belongs.

12. The method of claim 11, and also comprising decoding each of said data blocks with its error correction and/or error detection code.

13. The method of claim 11, wherein said decoding comprises Cyclic Redundancy Checksum decoding.

* * * * *